United States Patent [19]

Otake

[11] Patent Number: 5,677,606
[45] Date of Patent: Oct. 14, 1997

[54] DEVICE AND METHOD FOR DETECTING UNBALANCED CONDITION IN A LOAD DRIVEN BY A MOTOR

[75] Inventor: Keizo Otake, Aichi, Japan

[73] Assignee: Mitsubishi Denki Kabushiki Kaisha, Tokyo, Japan

[21] Appl. No.: 546,193

[22] Filed: Oct. 20, 1995

[30] Foreign Application Priority Data

Oct. 21, 1994 [JP] Japan .................... 6-256630

[51] Int. Cl.⁶ .................................................. H02P 3/00
[52] U.S. Cl. .................................... 318/434; 361/31
[58] Field of Search ............................ 318/432, 434, 318/798–824, 445, 453, 455; 361/23–32

[56] References Cited

U.S. PATENT DOCUMENTS

| | | | |
|---|---|---|---|
| 4,413,213 | 11/1983 | Baumgarten, Jr. | 361/30 X |
| 4,547,826 | 10/1985 | Premerlani | 361/25 |
| 4,653,285 | 3/1987 | Pohl | 361/22 X |
| 4,885,655 | 12/1989 | Springer et al. | 361/30 |
| 4,935,685 | 6/1990 | Justus et al. | 318/798 |
| 5,057,962 | 10/1991 | Alley et al. | 318/783 X |
| 5,309,075 | 5/1994 | Yokoe et al. | 318/799 X |

*Primary Examiner*—Jonathan Wysocki
*Attorney, Agent, or Firm*—Sughrue, Mion, Zinn, Macpeak & Seas, PLLC

[57] ABSTRACT

A method and device for detecting an out-of-balance condition of a load which is driven by a motor is disclosed. A present instantaneous value of a current of a motor which is driving a load is detected and an average value of the detected instantaneous value over time is established. The present instantaneous value is compared to the established average value, and the number of times which the instantaneous value differs from the average value by at least a prescribed amount is counted. If this number exceeds a certain number, it is determined that the load which the motor is driving is out of balance.

16 Claims, 15 Drawing Sheets

FIG. 3

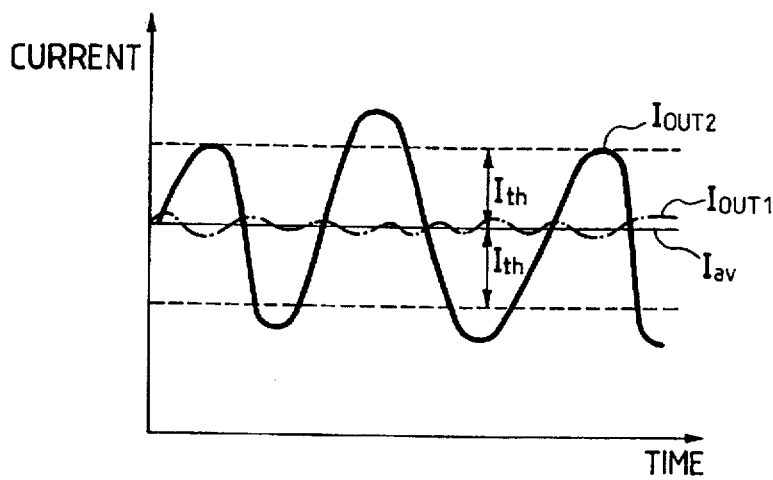

- $I_{av}$   OUTPUT CURRENT AVERAGE VALUE
- $I_{OUT1}$ OUTPUT CURRENT INSTANTANEOUS VALUE UPON LOAD BALANCING
- $I_{OUT2}$ OUTPUT CURRENT INSTANTANEOUS VALUE UPON LOAD UNBALANCING
- $I_{th}$   THRESHOLD VALUE

FIG. 5

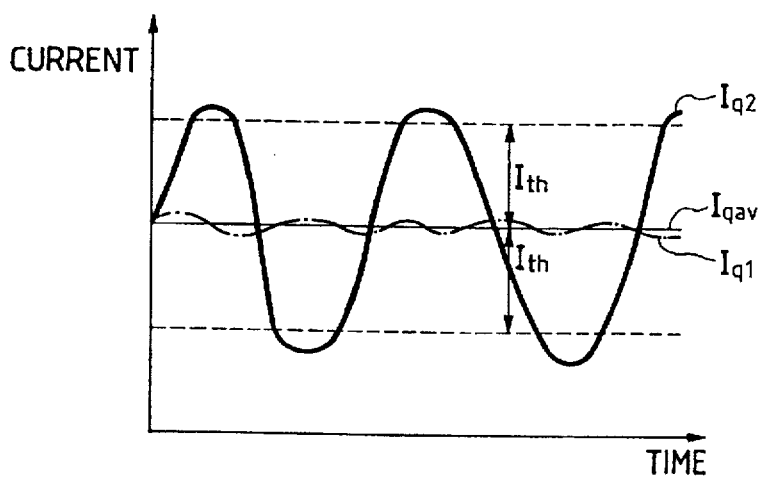

- $I_{qav}$   q-AXIS CURRENT AVERAGE VALUE
- $I_{q1}$   q-AXIS CURRENT INSTANTANEOUS VALUE UPON LOAD BALANCING
- $I_{q2}$   q-AXIS CURRENT INSTANTANEOUS VALUE UPON LOAD UNBALANCING
- $I_{th}$   THRESHOLD VALUE $I_{OUT3}$ OUTPUT CURRENT INSTANTANEOUS VALUE UPON ABRUPT LOAD INCREASING
$I_{av}$ OUTPUT CURRENT AVERAGE VALUE $I_{OUT4}$ OUTPUT CURRENT INSTANTANEOUS VALUE DURING ACCELERATION
$I_{av}$ OUTPUT CURRENT AVERAGE VALUE

DEVICE AND METHOD FOR DETECTING UNBALANCED CONDITION IN A LOAD DRIVEN BY A MOTOR

BACKGROUND OF THE INVENTION

The present invention relates to a load condition detection device for an induction motor and a load condition detecting method for the same.

A description will be given herein by taking a load imbalance detection device for a three-phase induction motor driven by an inverter as an example, but the invention is applicable to a variety of induction motors. Further, the variable-frequency, variable-voltage application power supply employed with the invention is also not limited to an inverter.

FIG. 18 shows a block diagram of a conventional load condition detection device for a three-phase induction motor. Here, load imbalance detection of a three-phase induction motor is described by taking a washing machine as an example. In FIG. 18, reference numeral 1 indicates an AC power supply; 51, an inverter; 6, a three-phase induction motor; 7, a load of the three-phase induction motor; and 50, a photosensor which is installed outside the outer peripheral surface of the rotational load.

When the load 7 is balanced, it rotates without eccentricity with respect to the center of rotation, and thus the photosensor 50 does not operate. If though the laundry collects on one side so that the load becomes unbalanced and rotates eccentrically more than a predetermined amount with respect to the center of rotation, the photosensor operates and detects the imbalanced condition of the load.

In the conventional load condition detection device for a three-phase induction motor 6, it is necessary to set the photosensor 50 individually in response to the amount of eccentricity of the load when the load is unbalanced. To detect slight eccentricity, the position of the photosensor 50 needs to be set precisely. Since the position of the photosensor 50 changes with time due to vibration when the three-phase induction motor 6 turns, etc., periodic position adjustment is required.

SUMMARY OF THE INVENTION

It is therefore an object of the invention to provide a load condition detection device for a three-phase induction motor which can easily detect load imbalance without change over time, enables easy change of the imbalance detection level, and eliminates the need for an optical device such as a photosensor, thereby reducing load imbalance detection costs.

According to the invention, there is provided a load condition detection device for an induction motor which causes rotational motion of a load when a predetermined current is input, the load condition detection device comprising a current detection means for detecting the instantaneous value of the input current, average current detection means for detecting an output current average value based on the current instantaneous value and a predetermined average time, current value comparison means for determining the difference between the current instantaneous value and the current average value, counting means for comparing the value obtained by the current value comparison means with a first predetermined value and counting the number of times the obtained value exceeds the predetermined value, and means for stopping motion of the load if the value counted by the counting means within a predetermined time exceeds a second predetermined value.

According to the invention, there is provided a load condition detection device for an induction motor effecting rotation of a load when a predetermined current is input, the load condition detection device comprising a current detection means for detecting a current instantaneous value of the current, average current detection means for determining a current average value based on the current instantaneous value and a predetermined average time, current value comparison means for determining a difference between the current instantaneous value and the current average value, counting means for comparing the value obtained by the current value comparison means with a first predetermined value and counting the number of times the obtained value has exceeded the predetermined value, and alarm means for informing the user that the load is in an imbalanced condition.

According to the invention, there is provided an induction motor load condition detection method comprising the steps of detecting the instantaneous value of a current for a load, determining a current average value of the current instantaneous values for a predetermined average time thereof, determining an absolute value of a difference between the output current instantaneous value and the current average value, detecting the number of times the absolute value exceeds a predetermined value, and outputting a load condition detection signal in response to the detection value.

According to the invention, there is provided an induction motor load condition detection method comprising the steps of detecting a current instantaneous value of q-axis current into which a current for a load is converted by d-q-axis current conversion means, determining a q-axis current average value of the current instantaneous values for a predetermined average time thereof, determining an absolute value of a difference between the q-axis current instantaneous value and the q-axis current average value, detecting the number of times the absolute value exceeds a predetermined value, and outputting a load condition detection signal in response to the detection value.

According to the invention, there is provided an induction motor load condition detection method comprising the steps of detecting a current instantaneous value of a current for a load, determining a first current average value for a first predetermined average time sufficiently short as compared with the load period of the current instantaneous values and a second current average value for a second predetermined average time sufficiently long as compared with the load period, determining an absolute value of a difference between the first and second current average values, detecting the number of times the absolute value exceeds a predetermined value, and outputting a load condition detection signal in response to the detection value.

According to the invention, there is provided an induction motor load condition detection method comprising the steps of detecting a current instantaneous value of a current for a load, determining a current average value of the current instantaneous values for a predetermined average time thereof, determining an absolute value of a difference between the current instantaneous value and the current average value, detecting the number of times a case occurs where the absolute value exceeds a predetermined value and differs in polarity from the preceding difference current exceeding the predetermined value, and outputting a load condition detection signal in response to the detection value.

In the inventive method, the number of times the absolute value exceeds the predetermined value is detected every predetermined time, and only when the predetermined number of times is exceeded within the predetermined time, the load condition detection signal is output.

In the method, the load condition detection signal is output by load condition detection start and end signals.

Also, in the method of the invention, a specified frequency is compared with an output frequency for determining whether-or not running at constant speed is being performed, and if it is determined that running at constant speed is being performed, the load condition detection operation is started by a signal indicating running at constant speed.

The load condition detection device for an induction motor effecting rotation of a load when a predetermined current is input comprises a current detection means for detecting a current instantaneous value of the input current, average current detection means for determining a current average value based on the current instantaneous value and a predetermined average time, current value comparison means for determining a difference between the current instantaneous value and the current average value, counting means for comparing the value obtained by the current value comparison means with a first predetermined value and counting the number of times the obtained value has exceeded the predetermined value, and means for stopping the rotation of the load if the value counted by the counting means within a predetermined time exceeds a second predetermined value.

The load condition detection device for an induction motor effecting rotation of a load when a predetermined current is input comprises a current detection means for detecting a current instantaneous value of the current, average current detection means for determining a current average value based on the current instantaneous value and a predetermined average time, current value comparison means for determining a difference between the current instantaneous value and the current average value, counting means for comparing the value obtained by the current value comparison means with a first predetermined value and counting the number of times the obtained value has exceeded the predetermined value, and alarm means for informing the user that the load is in an imbalanced condition.

The induction motor load condition detection method of the invention comprises the steps of detecting a current instantaneous value of a current for a load, determining a current average value of the current instantaneous values for a predetermined average time thereof, determining an absolute value of the difference between the current instantaneous value and the current average value, detecting the number of times the absolute value exceeds a predetermined value, and outputting a load condition detection signal in response to the detection value.

The induction motor load condition detection method comprises the steps of detecting a current instantaneous value of q-axis current into which a current for a load is converted by d-q axis current conversion means, determining a q-axis current average value of the current instantaneous values for a predetermined average time thereof, determining an absolute value of a difference between the q-axis current instantaneous value and the q-axis current average value, detecting the number of times the absolute value exceeds a predetermined value, and outputting a load condition detection signal in response to the detection value.

The induction motor load condition detection method comprising the steps of detecting a current instantaneous value of a current for a load, determining a first current average value for a first predetermined average time sufficiently short as compared with a load period of the current instantaneous values and a second current average value for a second predetermined average time sufficiently long as compared with the load period, determining an absolute value of a difference between the first and second current average values, detecting the number of times the absolute value exceeds a predetermined value, and outputting a load condition detection signal in response to the detection value.

The induction motor load condition detection method comprises the steps of detecting a current instantaneous value of an input current for a load, determining a current average value of the current instantaneous values for a predetermined average time thereof, determining an absolute value of a difference between the current instantaneous value and the current average value, detecting the number of times a case occurs where the absolute value exceeds a predetermined value and differs in polarity from the preceding difference current exceeding the predetermined value, and outputting a load condition detection signal in response to the detection value.

The number of times the absolute value exceeds the predetermined value is detected every predetermined time, and only when the predetermined number of times is exceeded within predetermined time, the load condition detection signal is output.

The load condition detection signal is output by load condition detection start and end signals.

A specified frequency is compared with an output frequency for determining whether or not running at constant speed is being performed, and if it is determined that running at constant speed is being performed, the load condition detection operation is started by a signal indicating running at constant speed.

BRIEF DESCRIPTION OF THE DRAWINGS

In the accompanying drawings:

FIG. 3 is a current waveform diagram showing the operation of a load unbalance detection means of the load condition detection device;

FIG. 5 is a current waveform diagram showing the operation of a load unbalance detection means of the load condition detection device;

DESCRIPTION OF THE PREFERRED EMBODIMENTS

Figure 1:
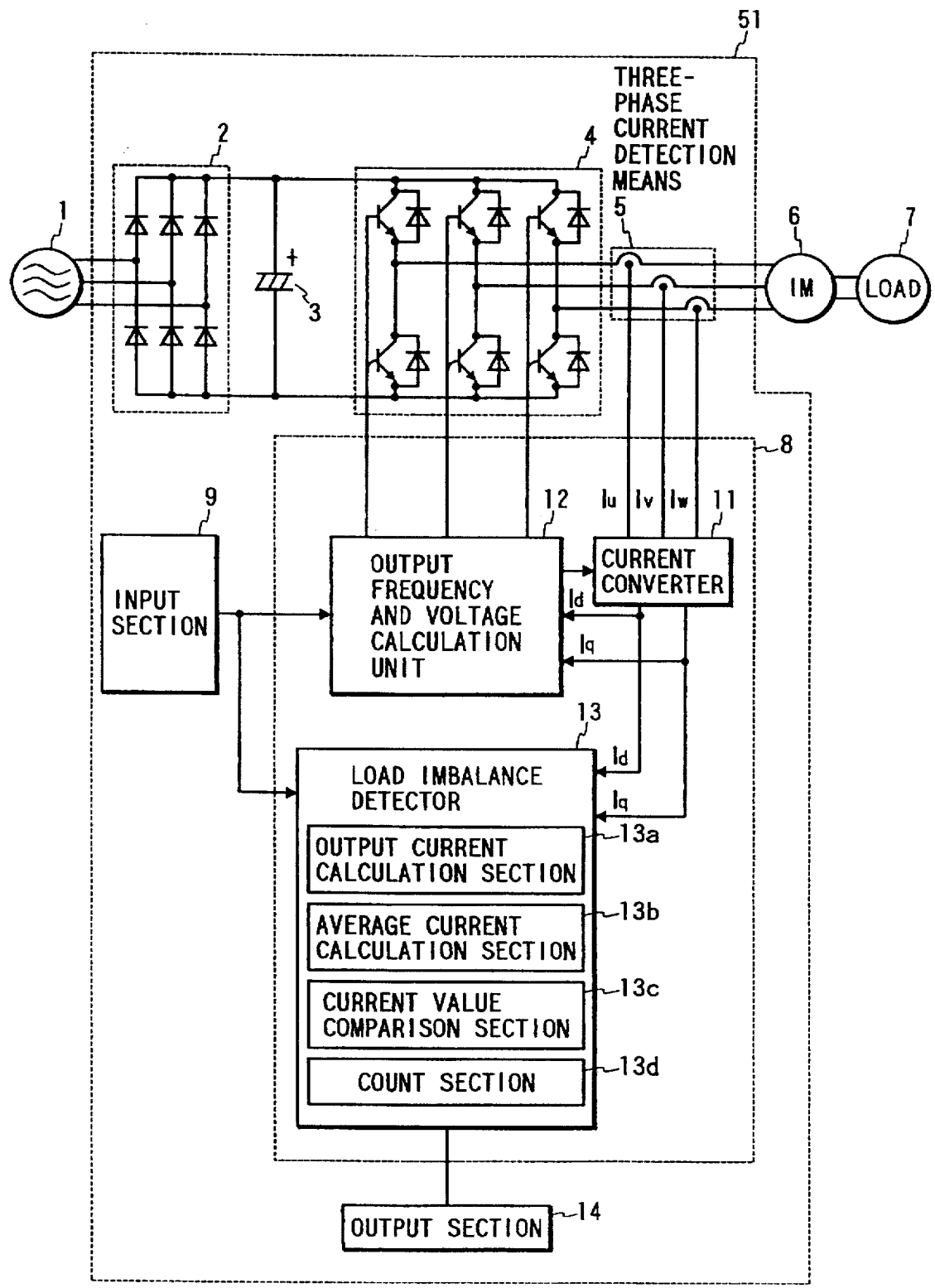
FIG. 1 is a block diagram showing a load condition detection device for a three-phase induction motor according to first to fifth embodiments of the invention.

FIG. 1 is a block diagram showing a load condition detection device for a three-phase induction motor constructed according to first to fifth embodiments of the invention. In FIG. 1, reference numeral 1 is an AC power supply; 2, a converter section of an inverter; 3, a smoothing capacitor of the inverter; 4, an inverter section of the inverter; 5, an electric current detector of the inverter; 6, a three-phase induction motor; 7, a load of the three-phase induction motor; 8, a control section of the inverter; 9, an input section of the inverter for inputting a run command and a setup value; 11, an electric current converter for converting a three-phase current detected by the three-phase current detector 5 into a d-q axis current rotating in synchronization with an output frequency and determining a d-axis current, an excitation phase current in vector control and a q-axis current, and a torque phase current; 12, output frequency and voltage calculation unit for calculating an output frequency and an output voltage from the setup value from the input section 9 and the d-axis current and q-axis current from the current converter 11; 13, load imbalance detector for detecting current fluctuation occurring secondarily as a result of load imbalance from the d-axis current and q-axis current from the current converter 11; 14, an output section for outputting a signal to the external upon detection of load imbalance; 51, the overall inverter.

Figure 2:
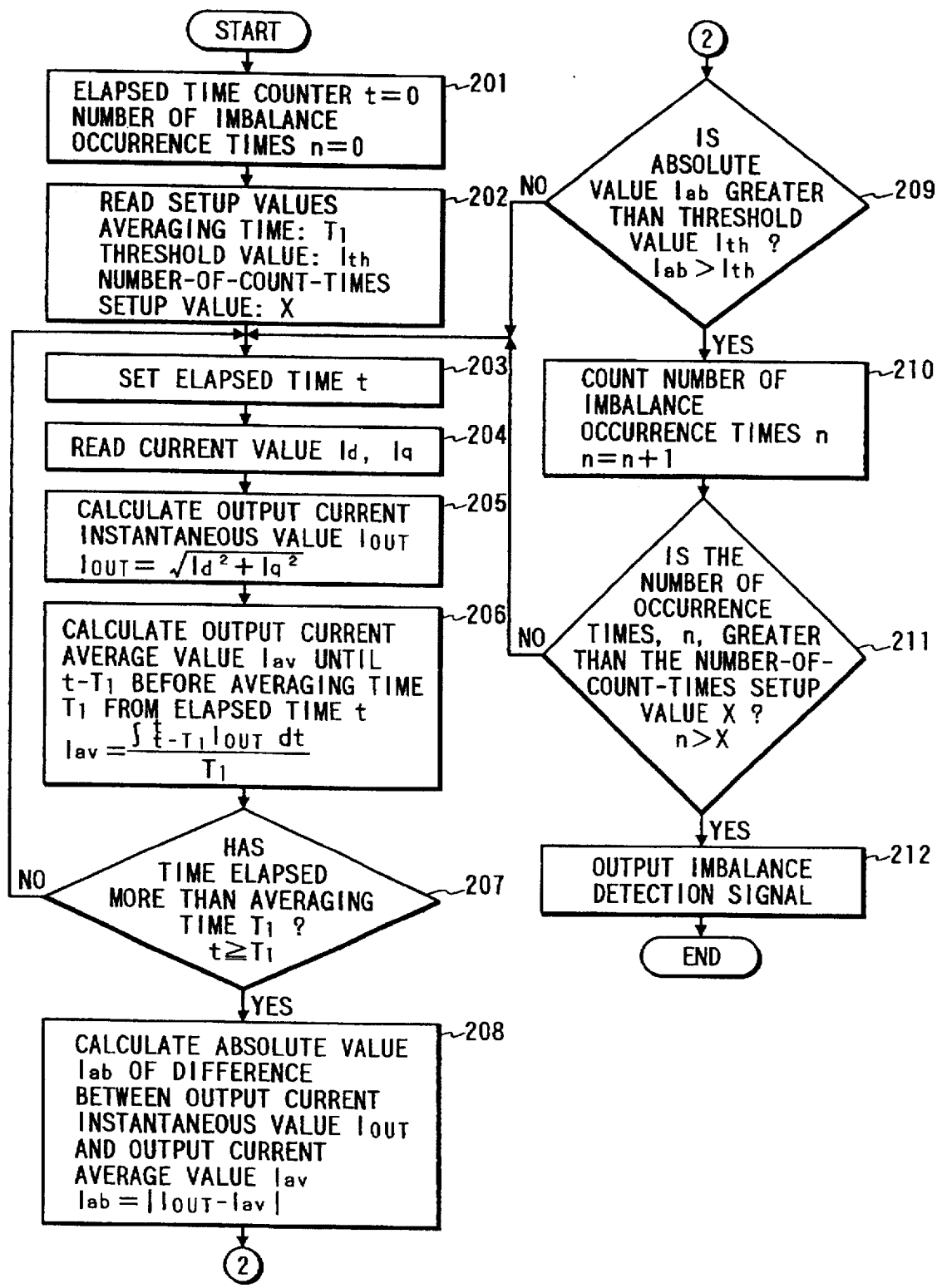
FIG. 2 is a flowchart showing an Operation 1 of the load condition detection device for the three-phase induction motor in FIG. 1.

FIG. 2 is a flowchart showing Operation 1 of the load imbalance detector 13 of the load condition detection device for the three-phase induction motor in FIG. 1. In the figure, reference numeral 201 is a step at which an elapsed time counter t and the number of times, n, imbalance has occurred are cleared to 0, numeral 202 is a step at which averaging time T1, a threshold value $I_{th}$, and a setup value X of the number of count times are read from the input section 9, numeral 203 is a step at which the elapsed time from detection start is set, numeral 204 is a step at which the d-axis current and q-axis current from the current converter 11 are read, numeral 205 is a step at which an output current instantaneous value is calculated, numeral 206 is a step at which an average current value i calculated, numeral 207 is a step at which whether or not the time elapsed is equal to or greater than the averaging time T1 is determined, numeral 208 is a step at which the absolute value of the difference between the output current instantaneous value and the output current average value, $I_{ab}$, is calculated, numeral 209 is a step at which whether or not $I_{ab}$ is greater than the threshold value $I_{th}$ is determined, numeral 210 is a step at which 1 is added to the number of times, n, imbalance has occurred, numeral 211 is a step at which whether or not the number of times, n, imbalance has occurred is greater than the setup value, X, of the number of count times is determined, and numeral 212 is a step at which an imbalance detection signal is output.

The operation of the embodiment will now be discussed. In FIG. 1, the inverter 51 executes three-phase full-wave rectification of an AC voltage of the AC power supply 1 by the converter section 2 and smooths the result through the smoothing capacitor 3 for conversion to DC. Then, the inverter section 4 again converts the DC into an AC voltage having the frequency and voltage calculated by the calculation unit 12 based on a command value from the input section 9 and outputs the AC voltage for driving the three-phase induction motor 6 for rotating the load 7. At the time, the three-phase current detector 5 detects the three-phase output current of the inverter and the current converter 11 converts the three-phase output current into the d-q axis rotating in synchronization with the output frequency for determining d-axis current and q-axis current. The output frequency and voltage calculation unit 12 uses the d-axis current and q-axis current to perform primary voltage correction control and slip correction control. The load imbalance detector 13 has an output current calculation section 13a for calculating an output current instantaneous value from a d-axis current instantaneous value, a q-axis current instantaneous value, an average current calculation section 13b for averaging the output current instantaneous values for the predetermined averaging time to determine an average current, a current value comparison section 13c for determining the difference between the output current instantaneous value and the output current average value, and a count section 13d for counting the number of times the current value difference has exceeded a predetermined value. When the count exceeds a predetermined value, the load imbalance detector 13 judges that the load is unbalanced and detects imbalance of the load of the three-phase induction motor, then outputs a signal through the output section 14. When the load is well balanced during normal constant-speed running, the output current is constant; when the load is unbalanced, for example, if laundry collects on one side in the tub of a washing machine, the rotation shaft of the three-phase induction motor 6 is not steady but it moves in the manner of a wooden pestle, causing the output current to fluctuate.

The current fluctuation is detected by the load imbalance detector 13, as shown the flowchart of FIG. 2.

At step 201, the elapsed time counter t and the number of times, n, imbalance has occurred are cleared to 0 as an initial reset. At step 202, the averaging time T1 sufficiently longer than the period of output frequency at constant-speed time, threshold value $I_{th}$, and setup value, X, of the number of count times set through the input section 9 are read. At step 203, the elapsed time is set in the counter t. At step 204, the d-axis current $I_d$ and q-axis current $I_q$ are read from the current converter 11. At step 205, an output current instantaneous value $I_{OUT}$ is calculated by the output current calculation section 13a. The reason why the d-axis current $I_d$ and q-axis current $I_q$ are used to calculate the output current instantaneous value is that the d-axis current $I_d$ and q-axis current $I_q$ are already calculated for use by the output frequency and voltage calculation unit 12 and are orthogonal components for facilitating calculation of the output current instantaneous value and that dedicated hardware is not required for determining the output current instantaneous value by executing full-wave rectification of the three-phase output current.

Next, at step 206, an average value of output current until t−T1 before the averaging time T1 from the elapsed time t is calculated by the average current calculation section 13b. The output current average value $I_{av}$ is updated each time t has elapsed. At step 207, whether or not the elapsed time is equal to or greater than the averaging time T1 is determined for judging that calculation of the first output current average value $I_{av}$ is complete. If the elapsed time t is less than the averaging time T1, calculation of the first output current average value $I_{av}$ is not complete. Then, control returns to step 203.

If t>T1, calculation of the first output current average value $I_{av}$ is complete. Then, at step 208 and 209, the absolute value $I_{ab}$ of the difference between the output current instantaneous value $I_{OUT}$ and the output current average value $I_{av}$ is calculated by the current value comparison section 13c and the threshold value $I_{th}$ read at step 202 is compared with the absolute value of the difference, $I_{ab}$. In the comparison, if the load is balanced at the constant-speed time, output current instantaneous value $I_{OUT}\approx$output current average value $I_{av}$ as shown in FIG. 3 and therefore $I_{ab}\approx 0$; if the load is unbalanced, the output current fluctuates and therefore $I_{ab}\approx 0$ does not result as shown in FIG. 3 and $I_{ab}>I_{th}$. Here, the threshold value $I_{th}$ is set to detect output current fluctuation when the load is unbalanced without detecting a minute output current instantaneous value when the load is balanced. When the load is balanced, the setup value of $I_{th}$ is increased gradually and is set to a value greater than the value at which the number of times imbalance has occurred is not counted. When $I_{ab}>I_{th}$ by the count section 13d at step 209, 1 is added to the number of times, n, imbalance has occurred at step 210. If $I_{ab}\leq I_{th}$, the load is judged to be balanced, and control returns to step 203. At step 211, whether or not the number of times, n, imbalance has occurred is greater than the setup value, X, of the number of count times read at step 202 is determined. If n>X, the load is judged to be unbalanced and an imbalance detection signal is output at step 212. If n≦X, control returns to step 203. Since current fluctuation repeatedly occurs when the load is unbalanced, the instantaneous output current $I_{OUT}$ will change momentarily for a different reason and the number of times, n, imbalance has occurred may be counted, outputting an imbalance detection signal in error. The number-of-count-times setup value X is set to prevent this error from occurring.

Thus, although the conventional detection device detects load imbalance as physical displacement, the detection device according to the embodiment detects load imbalance electrically. Therefore, there is provided a load condition detection device for a three-phase induction motor which enables easy change of load imbalance detection level and has detection precision not changing with time at low costs.

Figure 4:
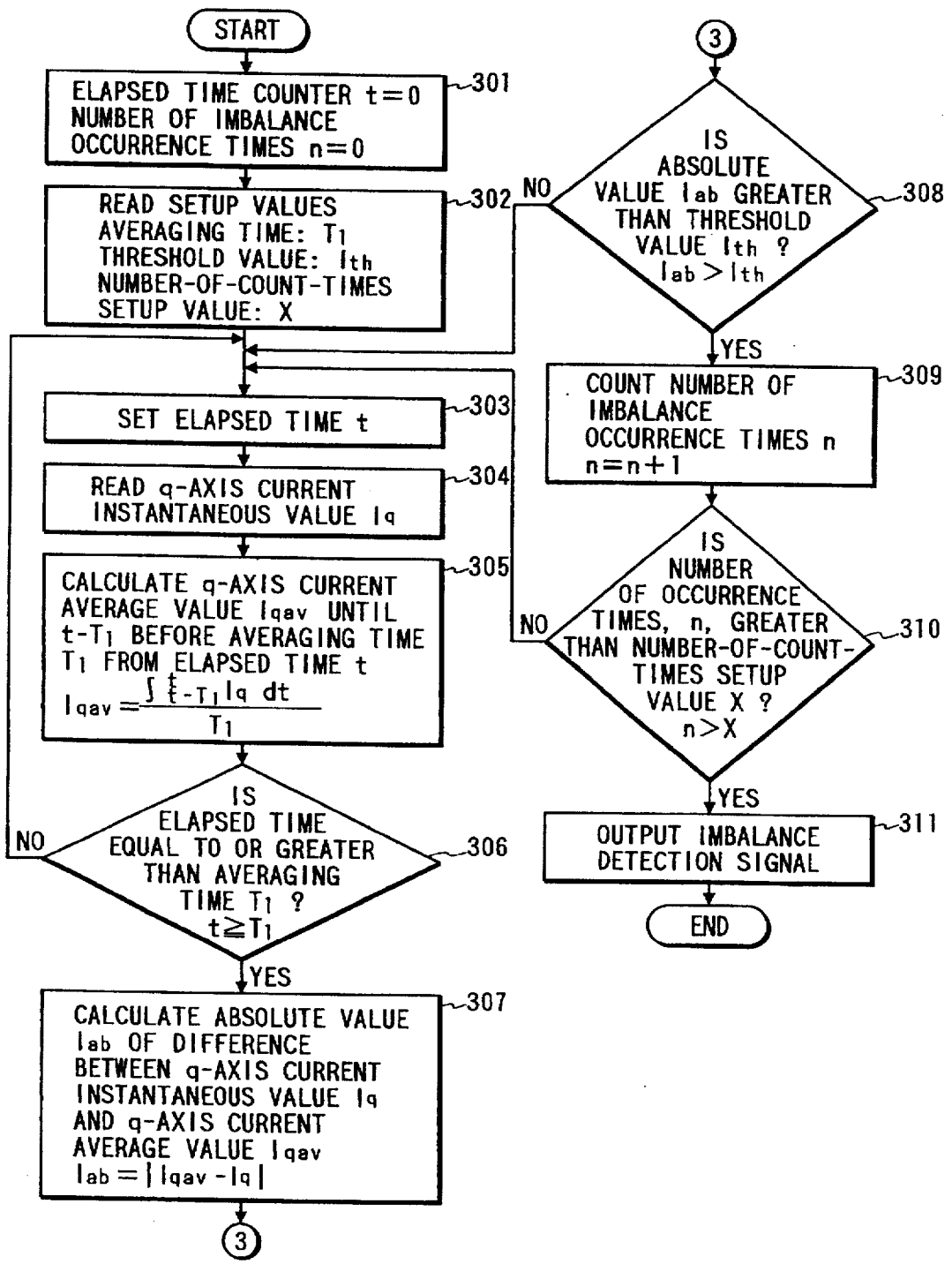
FIG. 4 is a flowchart showing an Operation 2 of the load condition detection device for the three-phase induction motor in FIG. 1.

FIG. 4 is a flowchart showing Operation 2 of the load imbalance detector 13 of the load condition detection device for the three-phase induction motor in FIG. 1. In the figure, reference numeral 301 is a step at which an elapsed time counter t and the number of times, n, imbalance has occurred are cleared to 0, numeral 302 is a step at which averaging time T1, a threshold value $I_{th}$, and a setup value, X, of the number of count times are read from the input section 9, numeral 303 is a step at which the elapsed time from detection start is set, numeral 304 is a step at which the q-axis current instantaneous value is read from the current converter 11, numeral 305 is a step at which a q-axis current average value is calculated, numeral 306 is a step at which whether or not the time elapsed is equal to or greater than the averaging time T1 is determined, numeral 307 is a step at which the absolute value of the difference between the q-axis current instantaneous value and the q-axis current average value, $I_{ab}$, is calculated, numeral 308 is a step at which whether or not $I_{ab}$ is greater than the threshold value $I_{th}$ is determined, numeral 309 is a step at which 1 is added to the number of times, n, imbalance has occurred, numeral 310 is a step at which whether or not the number of times, n, imbalance has occurred is greater than the setup value, X, of the number of count times is determined, and numeral 311 is a step at which an imbalance detection signal is output.

FIG. 5 is a current waveform diagram showing the Operation 2 of the load unbalance detector 13 shown in FIG. 1.

The operation of the embodiment will now be discussed.

At step 301, the elapsed time counter t and the number of times, n, imbalance has occurred are cleared to 0 as an initial reset. At step 302, the averaging time T1 sufficiently longer than the period of output frequency at constant-speed time, threshold value $I_{th}$, and setup value, X, of the number of count times set through the input section 9 are read. At step 303, the elapsed time is set in the counter t. At step 304, only the q-axis current instantaneous value $I_q$ is read from the current converter 11. The q-axis current instantaneous value $I_q$ is a torque component current and output current fluctuation when the load is unbalanced is mainly a torque change. Thus, if the q-axis current instantaneous value $I_q$ is used for detection, a large change appears.

Next, at step 305, a q-axis current average value until t−T1 before the averaging time T1 from the elapsed time t is calculated. The q-axis current average value $I_{qav}$ is updated each time the elapsed time t has elapsed. At step 306, whether or not the elapsed time is equal to or greater than the averaging time T1 is determined for judging that calculation of the first q-axis current average value $I_{qav}$ is complete. If the elapsed time t is less than the averaging time T1, calculation of the first q-axis current average value $I_{qav}$ is not complete. Then, control returns to step 303. If t>T1, calculation of the first q-axis current average value $I_{qav}$ is complete. Then, at step 307, the absolute value $I_{ab}$ of the difference between the q-axis current instantaneous value $I_q$ and the q-axis current average value $I_{qav}$ is calculated. At step 308, the threshold value $I_{th}$ read at step 302 is compared with the absolute value of the difference, $I_{ab}$. In the comparison, if the load is balanced at the constant-speed time, the q-axis current instantaneous value $I_q\approx$q-axis current average value $I_{qav}$, and therefore $I_{ab}\approx 0$; if the load is unbalanced, the q-axis current instantaneous value $I_q$ fluctuates and therefore $I_{ab}\approx 0$ does not result and $I_{ab}>I_{th}$. The threshold value $I_{th}$ is set to detect q-axis current fluctuation when the load is unbalanced without detecting a minute q-axis current instantaneous value $I_q$ when the load is balanced. When the load is balanced, the setup value of $I_{th}$ is increased gradually and is set to a value greater than the value at which the number of times imbalance has occurred is not counted.

When $I_{ab}>I_{th}$ at step 308, 1 is added to the number of times, n, imbalance has occurred at step 309. If $I_{ab}\leq I_{th}$, the load is judged to be balanced, and control returns to step

303. At step 310, whether or not the number of times, n, imbalance has occurred is greater than the setup value, X, of the number of count times read at step 302 is determined. If n>X, the load is judged to be unbalanced and an imbalance detection signal is output at step 311. If n≦X, control returns to step 303. Since current fluctuation repeatedly occurs when the load is unbalanced, the q-axis current instantaneous value $I_q$ will change momentarily for a different reason and the number of times, n, imbalance has occurred may be counted, outputting an imbalance detection signal in error. The number-of-count-times setup value X is set to prevent this error from occurring.

Thus, load imbalance can be easily detected stably with high precision by using only the q-axis current instantaneous value without the d-axis current instantaneous value.

Figure 6:
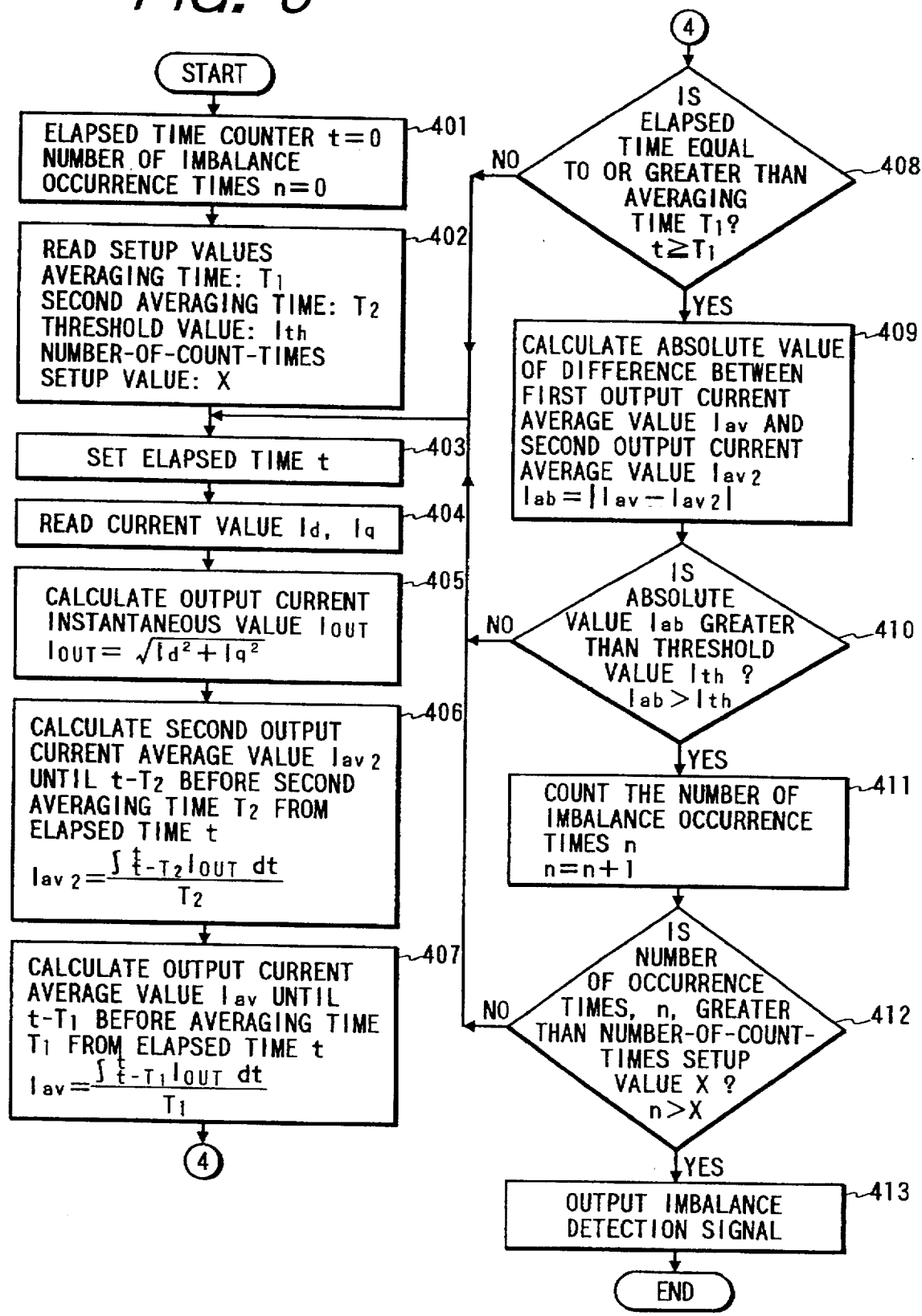
FIG. 6 is a flowchart showing an Operation 3 of the load condition detection device for the three-phase induction motor in FIG. 1.

FIG. 6 is a flowchart showing Operation 3 of the load imbalance detector 13 of the load condition detection device for the three-phase induction motor in FIG. 1. In the figure, numeral 401 is a step at which an elapsed time counter t and the number of times, n, imbalance has occurred are cleared to 0, numeral 402 is a step at which averaging time T1, second averaging time T2, a threshold value $I_{th}$, and a setup value, X, of the number of count times are read from the input section 9, numeral 403 is a step at which the elapsed time from detection start is set, numeral 404 is a step at which the d-axis current and q-axis current from the current converter 11 are read, numeral 405 is a step at which an output current instantaneous value is calculated, numeral 406 is a step at which a second output current average value is calculated, numeral 407 is a step at which a first output current average value is calculated, numeral 408 is a step at which whether or not the time elapsed is equal to or greater than the averaging time T1 is determined, numeral 409 is a step at which the absolute value of the difference between the second output current average value and the first output current average value, $I_{ab}$, is calculated, numeral 410 is a step at which whether or not $I_{ab}$ is greater than the threshold value $I_{th}$ is determined, numeral 411 is a step at which 1 is added to the number of times, n, imbalance has occurred, numeral 412 is a step at which whether or not the number of times, n, imbalance has occurred is greater than the setup value, X, of the number of count times is determined, and numeral 413 is a step at which an imbalance detection signal is output.

The operation of the embodiment will now be discussed.

At step 401, the elapsed time counter t and the number of times, n, imbalance has occurred are cleared to 0 as an initial reset. At step 402, the averaging time T1 sufficiently long as compared with the period of output frequency of the inverter at constant-speed time and therefore the load rotation period, the second averaging time T2 sufficiently short as compared with the load rotation period, current value threshold value $I_{th}$, and setup value, X, of the number of count times set through the input section 9 are read. At step 403, the elapsed time is set in the counter t. At step 404, the d-axis current $I_d$ and q-axis current $I_q$ are read from the current converter 11. At step 405, an output current instantaneous value $I_{OUT}$ is calculated.

Next, at step 406, a second output current average value until t−T2 before the second averaging time T2 from the elapsed time t is calculated. The second output current average value $I_{av2}$ is set to a value sufficiently shorter than the averaging time T1 and longer than the read period of the current value from the current converter 11 at step 404 in order to prevent the threshold value $I_{th}$ from being set too large and load imbalance from being unable to be detected if the output current instantaneous value $I_{OUT}$ is affected by noise or the like and fluctuations. The second average current value is updated each time the elapsed time t has elapsed.

Next, at step 407, a first output current average value until t−T1 before the averaging time T1 from the elapsed time t is calculated. The first output current average value $I_{av}$ is updated each time the elapsed time t has elapsed. At step 408, whether or not the elapsed time is equal to or greater than the averaging time T1 is determined for judging that calculation of the initial first output current average value $I_{av}$ is complete. If the elapsed time t is less than the averaging time T1, calculation of the initial first output current average value $I_{av}$ is not complete. Then, control returns to step 403. If t>T1, calculation of the initial first output current average value $I_{av}$ is complete. Then, control advances to step 409. Since the average time is shorter than T1, the second output current average value $I_{av2}$ is calculated at this point in time. Subsequently, at step 409, the absolute value $I_{ab}$ of the difference between the second output current average value $I_{av2}$ and the first output current average value $I_{av}$ is calculated. At step 410, the threshold value $I_{th}$ read at step 402 is compared with the absolute value of the difference, $I_{ab}$. In the comparison, if the load is balanced at the constant-speed time, second output current average value $I_{av2}$≈first output current average value $I_{av}$ and therefore $I_{ab}$≈0; if the load is unbalanced, the second output current average value $I_{av2}$ fluctuates and therefore $I_{ab}$≈0 does not result, and $I_{ab}$>$I_{th}$. Here, the threshold value $I_{th}$ is set to detect output current fluctuation when the load is unbalanced without detecting a minute second output current average value $I_{av2}$ when the load is balanced. When the load is balanced, the setup value of $I_{th}$ is increased gradually and is set to a value greater than the value at which the number of times imbalance has occurred is not counted.

When $I_{ab}$>$I_{th}$ at step 410, 1 is added to the number of times, n, imbalance has occurred at step 411. If $I_{ab}$≦$I_{th}$, the load is judged to be balanced, and control returns to step 403. At step 412, whether or not the number of times, n, imbalance has occurred is greater than the setup value, X, of the number of count times read at step 402 is determined. If n>X, the load is judged to be unbalanced and an imbalance detection signal is output at step 413. If n≦X, control returns to step 403. Since current fluctuation repeatedly occurs when the load is unbalanced, the second output current average value $I_{av2}$ will change momentarily for a different reason and the number of times, n, imbalance has occurred may be counted, outputting an imbalance detection signal in error. The number-of-count-times setup value X is set to prevent this error from occurring.

Thus, erroneous detection caused by the effect of noise, etc., can be prevented and it is not necessary to set the threshold value of the difference current value used to detect load imbalance to a large value more than necessary; load imbalance can be detected with higher precision.

Figure 7:
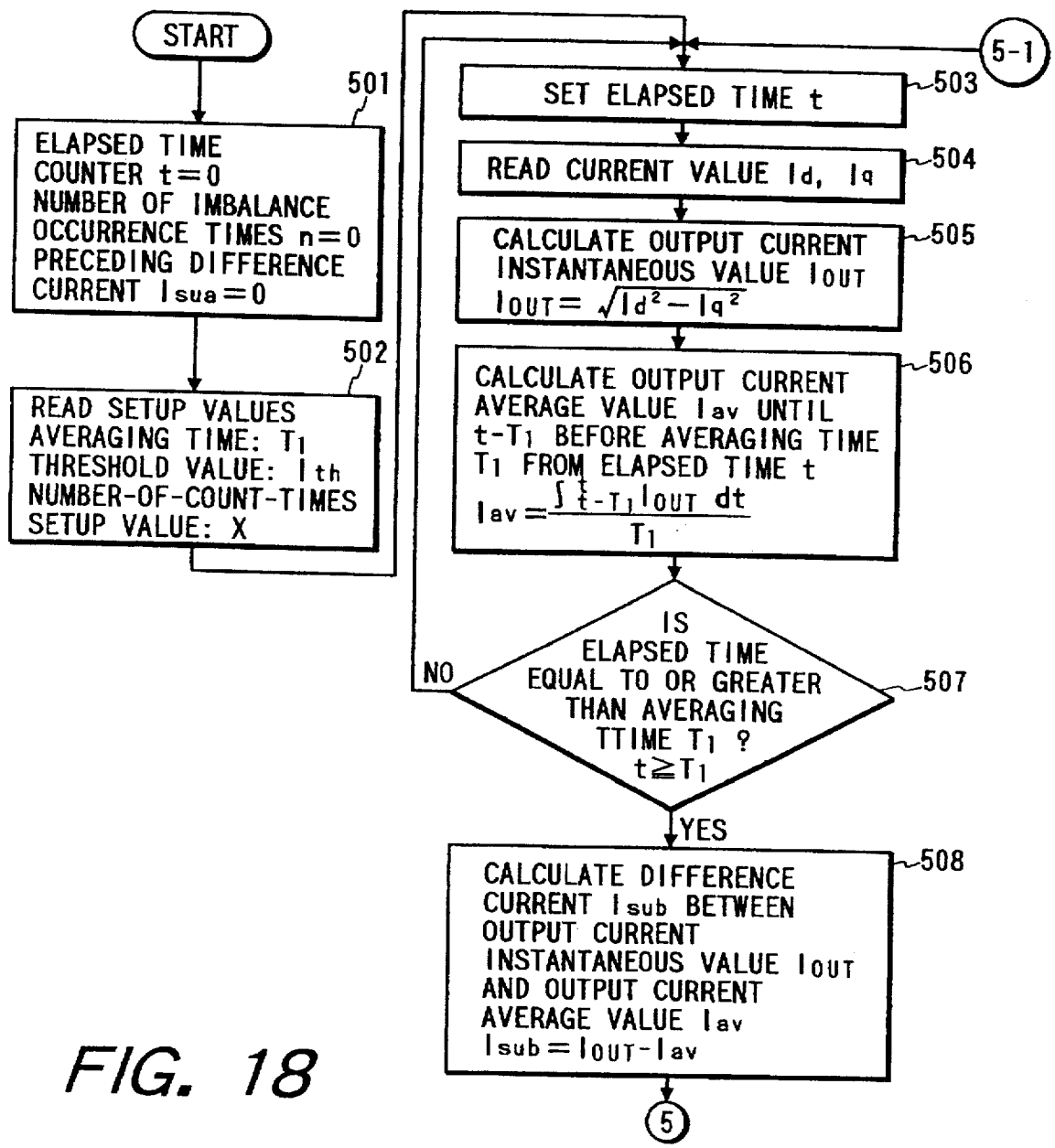
FIG. 7 is a flowchart showing an Operation 4 of the load condition detection device of the three-phase induction motor in FIG. 1.
Figure 18:
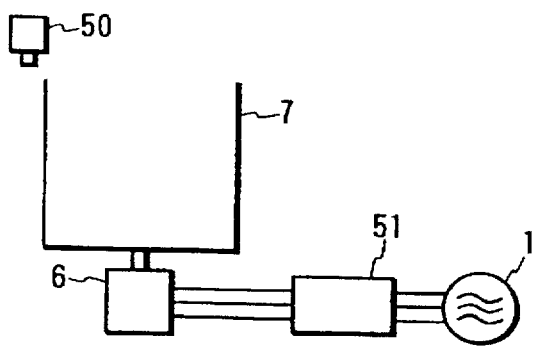
FIG. 18 is a block diagram of a conventional load condition detection device for a three-phase induction motor.
Figure 8:
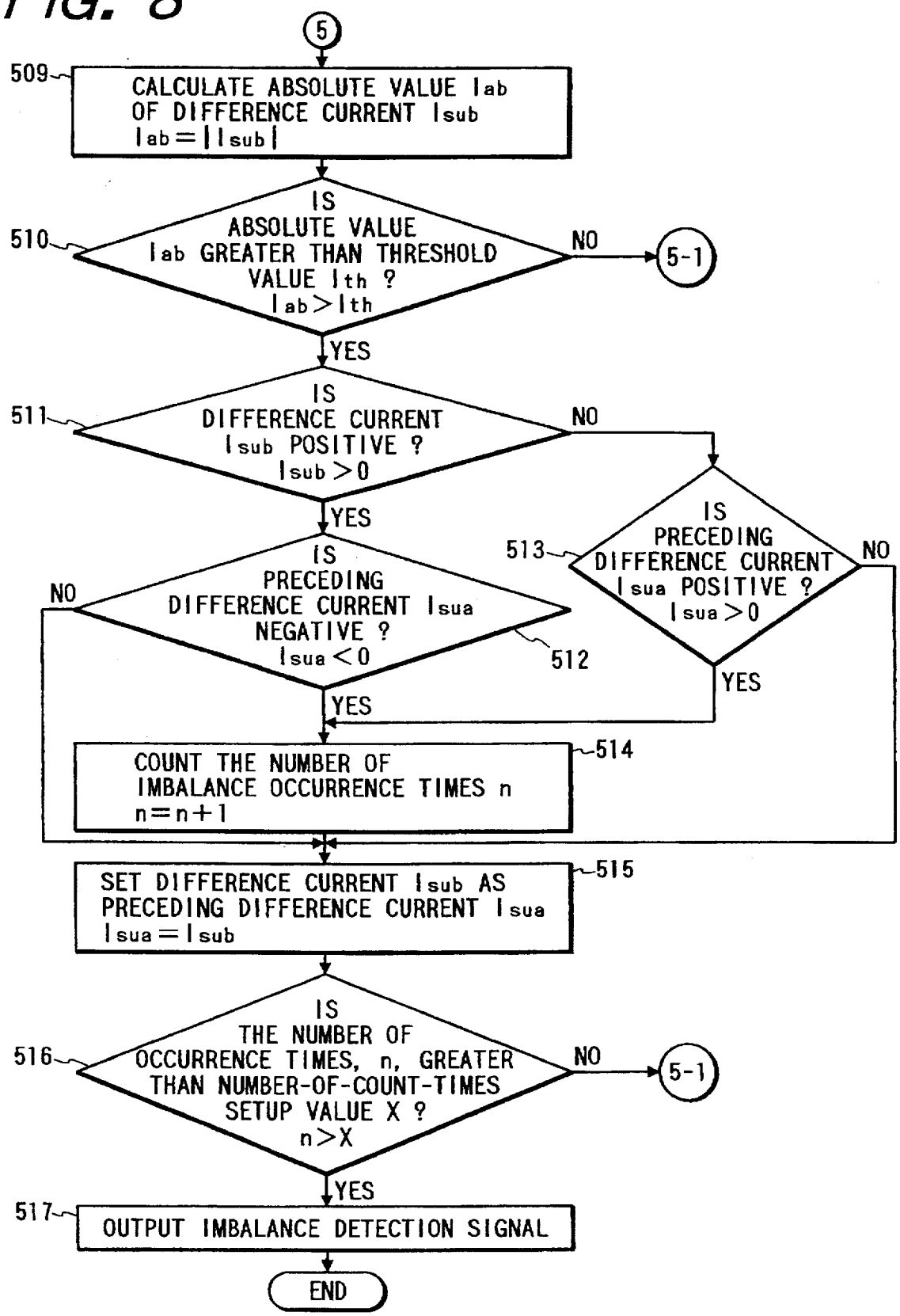
FIG. 8 is also a flowchart following the flowchart of FIG. 7.

FIGS. 7 and 8 are flowcharts showing Operation 4 of the load imbalance detector 13 of the load condition detection device for the three-phase induction motor in FIG. 1. In the figure, reference numeral 501 is a step at which an elapsed time counter t, the number of times, n, imbalance has occurred and preceding difference current $I_{sua}$ are cleared to 0, numeral 502 is a step at which averaging time T1, a threshold value $I_{th}$, and a setup value, X, of the number of count times are read from the input section 9, numeral 503 is a Step at which the elapsed time from detection start is set, numeral 504 is a step at which the d-axis current and q-axis current from the current converter 11 are read, numeral 505 is a step at which an output current instantaneous value is calculated, numeral 506 is a step at which an output current average value is calculated, numeral 507 is a step at which whether or not the time elapsed is equal to or greater than the averaging time T1 is determined, numeral 508 is a step at which the difference current between the output current instantaneous value and the output current average value, $I_{sub}$ is calculated, numeral 509 is a step at which the absolute value $I_{ab}$ of the difference current $I_{sub}$ is calculated, numeral 510 is a step at which whether or not $I_{ab}$ is greater than the threshold value $I_{th}$ is determined, numeral 511 is a step at which whether or not the difference current $I_{sub}$ is positive is determined, numeral 512 is a step at which whether or not the preceding difference current $I_{sua}$ is negative is determined, numeral 513 is a step at which whether or not the preceding difference current $I_{sua}$ is positive is determined, numeral 514 is a step at which 1 is added to the number of times, n, imbalance has occurred, numeral 515 is a step at which the difference current $I_{sub}$ is set as the preceding difference current $I_{sua}$, numeral 516 is a step at which whether or not the number of times, n, imbalance has occurred is greater than the setup value, X, of the number of count times is determined, and numeral 517 is a step at which an imbalance detection signal is output.

Figure 9:
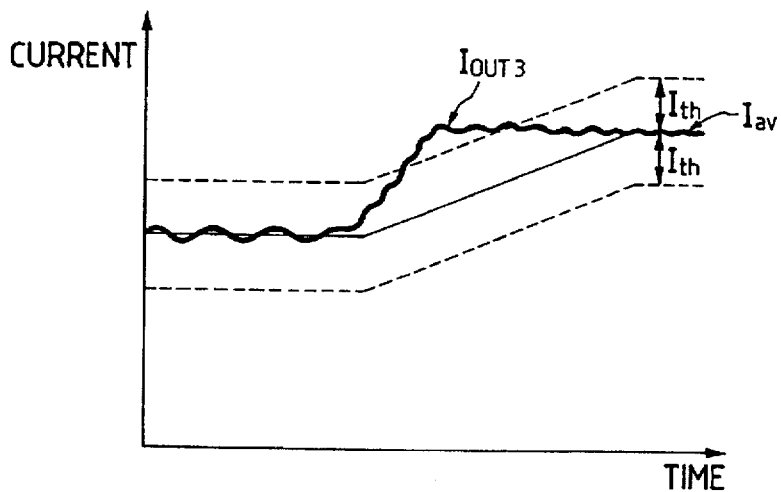
FIG. 9 is a current waveform diagram showing an Operation 4 of a load unbalance detection means of the load condition detection device.

FIG. 9 is a current waveform diagram showing Operation 4 of the load imbalance detector 13 of the load condition detection device for the three-phase induction motor in FIG. 1.

The operation of this embodiment will now be discussed.

At step 501, the elapsed time counter t, the number of times, n, imbalance has occurred and the preceding difference current $I_{sua}$ are cleared to 0 as an initial reset. The preceding difference current $I_{sua}$ is the value of difference current exceeding the preceding threshold value $I_{th}$ when the same imbalance is detected. At step 502, the averaging time T1 sufficiently longer than the period of output frequency at constant-speed time, threshold value $I_{th}$, and setup value, X, of the number of count times set through the input section 9 are read. At step 503, the elapsed time is set in the counter t. At step 504, the d-axis current $I_d$ and q-axis current $I_q$ are read from the current converter 11. At step 505, an output current instantaneous value $I_{OUT}$ is calculated. Next, at step 506, an average value of output current until t–T1 before the averaging time T1 from the elapsed time t is calculated. The output current average value $I_{av}$ is updated each time the elapsed time t has elapsed. At step 507, whether or not the elapsed time is equal to or greater than the averaging time T1 is determined for judging that calculation of the first output current average value $I_{av}$ is complete. If the elapsed time t is less than the averaging time T1, calculation of the first output current average value $I_{av}$ is not complete. Then, control returns to step 503. If t>T1, calculation of the first output current average value $I_{av}$ is complete. Then, control goes to step 508 at which the output current average value $I_{av}$ is subtracted from the output current instantaneous value $I_{OUT}$ to find the difference current $I_{sub}$. At step 509, the absolute value $I_{ab}$ of the difference current $I_{sub}$ is calculated. At step 510, the threshold value $I_{th}$ read at step 502 is compared with the absolute value of the difference, $I_{ab}$.

If $I_{ab} \leq I_{th}$ at step 510, the load is judged to be balanced, and control returns to step 503; if $I_{ab} > I_{th}$, control goes to step 511 at which whether or not the difference current $I_{sub}$ determined at step 509 is positive is determined. If the difference current $I_{sub}$ is positive, control goes to step 512 at which whether or not the preceding difference current with $I_{ab} > I_{th}$, $I_{sua}$, is negative is determined. If the preceding difference current $I_{sua}$ is negative at step 512, the load is judged to be unbalanced and 1 is added to the number of times, n, imbalance has occurred at step 514, and the present difference current $I_{sub}$ is set as the preceding difference current $I_{sua}$ at step 515. If the preceding difference current $I_{sua}$ is positive at step 512, step 514 is skipped, and the present difference current $I_{sub}$ is set as the preceding difference current $I_{sua}$ at step 515. On the other hand, if the difference current $I_{sub}$ is not positive at step 511, control goes to step 513 at which whether or not the preceding difference current with $I_{ab} > I_{th}$, $I_{sua}$, is positive is determined. If the preceding difference current $I_{sua}$ is positive at step 513, the load is judged to be unbalanced and 1 is added to the number of times, n, imbalance has occurred at step 514, and the present difference current $I_{sub}$ is set as the preceding difference current $I_{sua}$ at step 515. If the preceding difference current $I_{sua}$ is negative at step 512, step 514 is skipped, and the present difference current $I_{sub}$ is set as the preceding difference current $I_{sua}$ at step 515. Steps 511 to 515 are intended to count the time when the upper limit ($I_{ab} > I_{th}$ with $I_{sub} > 0$) and the lower limit ($I_{ab} > I_{th}$ with $I_{sub} < 0$) are exceeded alternately as the number of imbalance occurrence times by giving attention to the fact that load imbalance causes big and small waves to appear in the output current.

At step 516, whether or not the number of times, n, imbalance has occurred is greater than the setup value, X, of the number of count times read at step 502 is determined. If n>X, the load is judged to be unbalanced and an imbalance detection signal is output at step 517. If n>X, control returns to step 503.

Thus, by detecting large and small waves of output current occurring when load imbalance occurs, it is not necessary to set the threshold value of the difference current value used to detect load imbalance to a large value more than necessary; load imbalance can be detected with higher precision.

Figure 10:
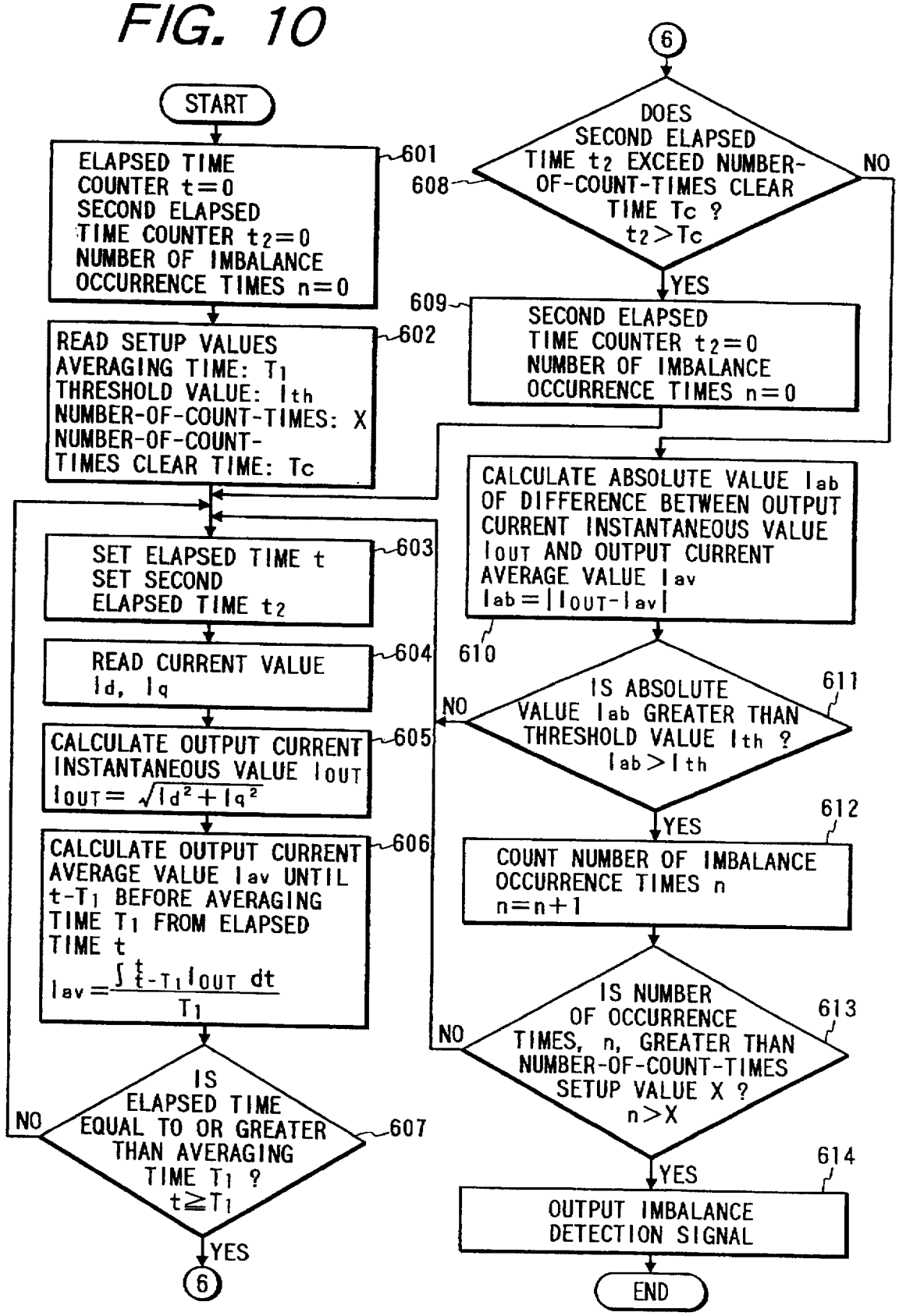
FIG. 10 is a flowchart showing an Operation 5 of the load condition detection device for the three-phase induction motor in FIG. 1.

FIG. 10 is a flowchart showing Operation 5 of the load imbalance detector 13 of the load condition detection device for the three-phase induction motor in FIG. 1. In the figure, reference numeral 601 is a step at which an elapsed time counter t, a second elapsed counter t2, and the number of times, n, imbalance has occurred are cleared to 0, numeral 602 is a step at which averaging time T1, a threshold value $I_{th}$, a setup value, X, of the number of count times and the number-of-count-times clear time Tc are read from the input section 9, numeral 603 is a step at which the elapsed time from detection start is set and the second elapsed time t2 are also set, numeral 604 is a step at which the d-axis current and q-axis current from the current converter 11 are read, numeral 605 is a step at which an output current instantaneous value is calculated, numeral 606 is a step at which an output current average value is calculated, numeral 607 is a step at which whether or not the time elapsed is equal to or greater than the averaging time T1 is determined, numeral 608 is a step at which whether the second elapsed time t2 exceeds the number-of-count-times clear time Tc or not is determined, numeral 609 is a step at which the second elapsed time t2 and the number of times, n, imbalance has occurred, are cleared to 0, numeral 610 is a step at which the absolute value of the difference between the output current instantaneous value and the output current average value, $I_{ab}$, is calculated, numeral 611 is a step at which whether or not $I_{ab}$ is greater than the threshold value $I_{th}$ is determined, numeral 612 is a step at which 1 is added to the number of times, n, imbalance has occurred numeral 613 is a step at which whether or not the number of times, n, imbalance has occurred is greater than the setup value, X, of the number of count times is determined, and numeral 614 is a step at which an imbalance detection signal is output.

The operation of this embodiment will now be discussed.

At step 601, the elapsed time counter t, the second elapsed time counter t2, and the number of times, n, imbalance has occurred are cleared to 0 as an initial reset. At step 602, the averaging time T1 sufficiently longer than the period of output frequency at constant-speed time, threshold value $I_{th}$, setup value, X, of the number of count times and the number-of-count-times clear time Tc set through the input section 9 are read. At step 603, the elapsed time from the detection start is set and the time from the 0 clear is also set in the second elapsed time t2. At step 604, the d-axis current $I_d$ and q-axis current $I_q$ are read from the current converter 11. At step 605, an instantaneous output current value $I_{OUT}$ is calculated.

Next, at step 606, an average value of output current until t-T1 before the averaging time T1 from the elapsed time t is calculated. The output current average value $I_{av}$ is updated each time the elapsed time t has elapsed. At step 607, whether or not the elapsed time is equal to or greater than the averaging time T1 is determined for judging that calculation of the first output current average value $I_{av}$ is complete. If the elapsed time t is less than the averaging time T1, calculation of the first output current average value $I_{av}$ is not complete. Then, control returns to step 603.

If t>T1, calculation of the first output current average value $I_{av}$ is complete. Then, control goes to step 608 at which whether the second elapsed time t2 exceeds the number-of-count-times clear time Tc or not is determined. If the former exceeds the latter, the second elapsed time t2 and the number of times, n, imbalance has occurred are cleared to 0 at step 609 and control returns to step 603. If t2 does not exceed Tc, control goes to step 610. The number-of-count-times clear time Tc is set longer than the averaging time T1.

The reason why the number of times, n, imbalance has occurred is cleared to 0 according to the time is as follows: Since instantaneous change of output current repeatedly occurs in a load imbalanced condition, imbalance occurs more than the number of times set in the number-of-count-times setup value X within the number-of-count-times clear time Tc. Therefore, the number of imbalance occurrence times, n, is cleared to 0 each time the time has elapsed, and if the number of imbalance occurrence times, n, is small, it is handled as erroneous detection.

At step 610, the absolute value $I_{ab}$ of the difference between the output current instantaneous value $I_{OUT}$ and the output current average value $I_{av}$ is calculated. At step 611, the threshold value $I_{th}$ read at step 602 is compared with the absolute value of the difference, $I_{ab}$. When $I_{ab}>I_{th}$ at step 611, 1 is added to the number of times, n, imbalance has occurred at step 612. If $I_{ab} \leq I_{th}$, the load is judged to be balanced, and control returns to step 603. At step 613, whether or not the number of times, n, imbalance has occurred is greater than the setup value, X, of the number of count times read at step 602 is determined. If n>X, the load is judged to be unbalanced and an imbalance detection signal is output at step 614. If n≤X, control returns to step 603. Thus, a predetermined time for counting the number of times is set and the number of occurrence times is cleared to 0 every predetermined time and if the number of imbalance occurrence times, n, is small, it is handled as erroneous detection, whereby load imbalance is not detected more than necessary and therefore load of the three-phase induction motor can be run efficiently.

Figure 11:
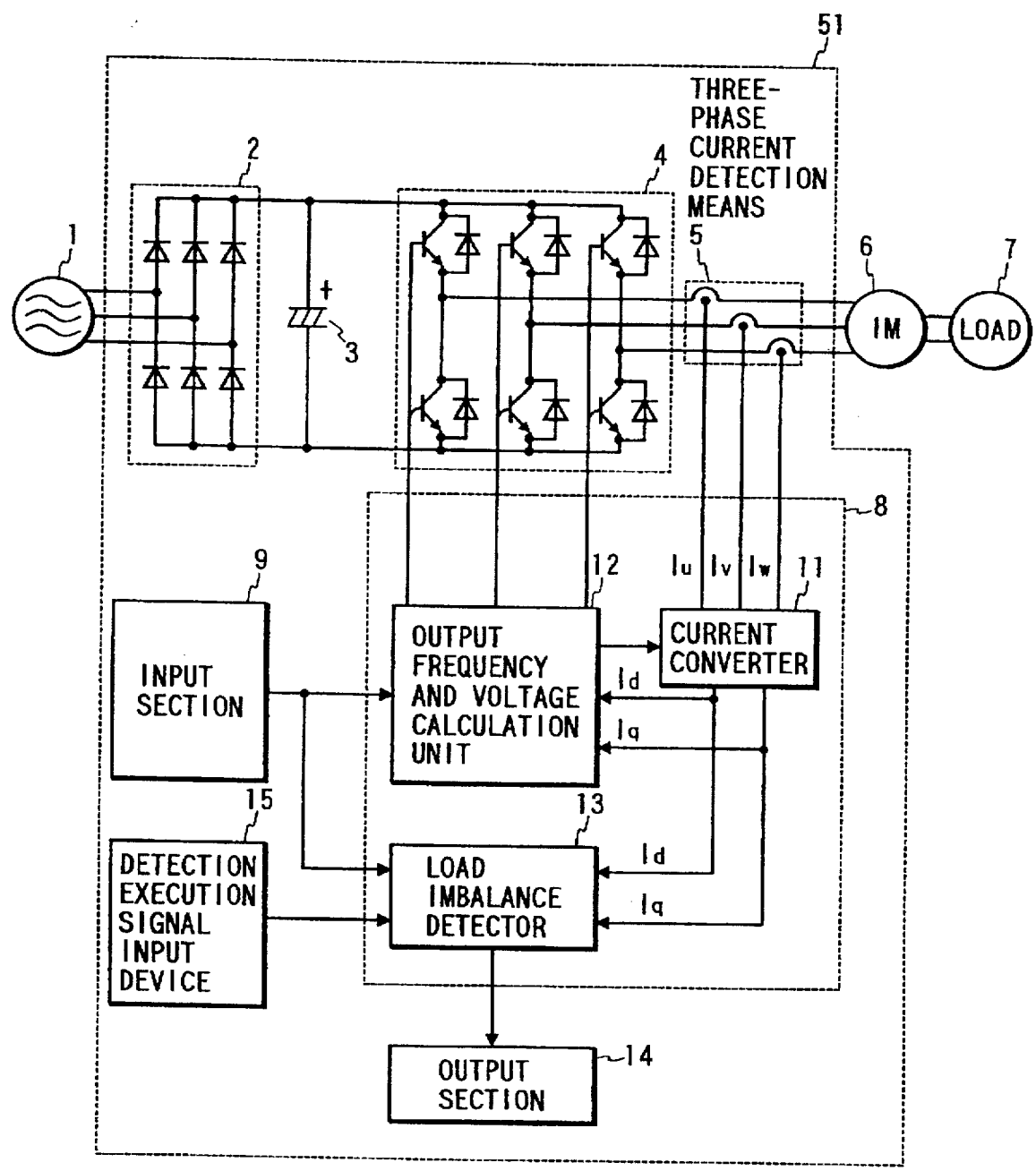
FIG. 11 is a block diagram showing a load condition detection device for a three-phase induction motor according to a sixth embodiment of the invention.

FIG. 11 is a block diagram showing a load condition detection device for a three-phase induction motor according to a sixth embodiment of the invention. Elements the same as those previously described with reference to FIG. 1 are denoted by the same reference numerals in FIG. 11 and will not be discussed again. In this drawing, reference numeral 15 is detection execution signal input device which is turned on and off from an external input for starting and terminating load imbalance detection.

Figure 12:
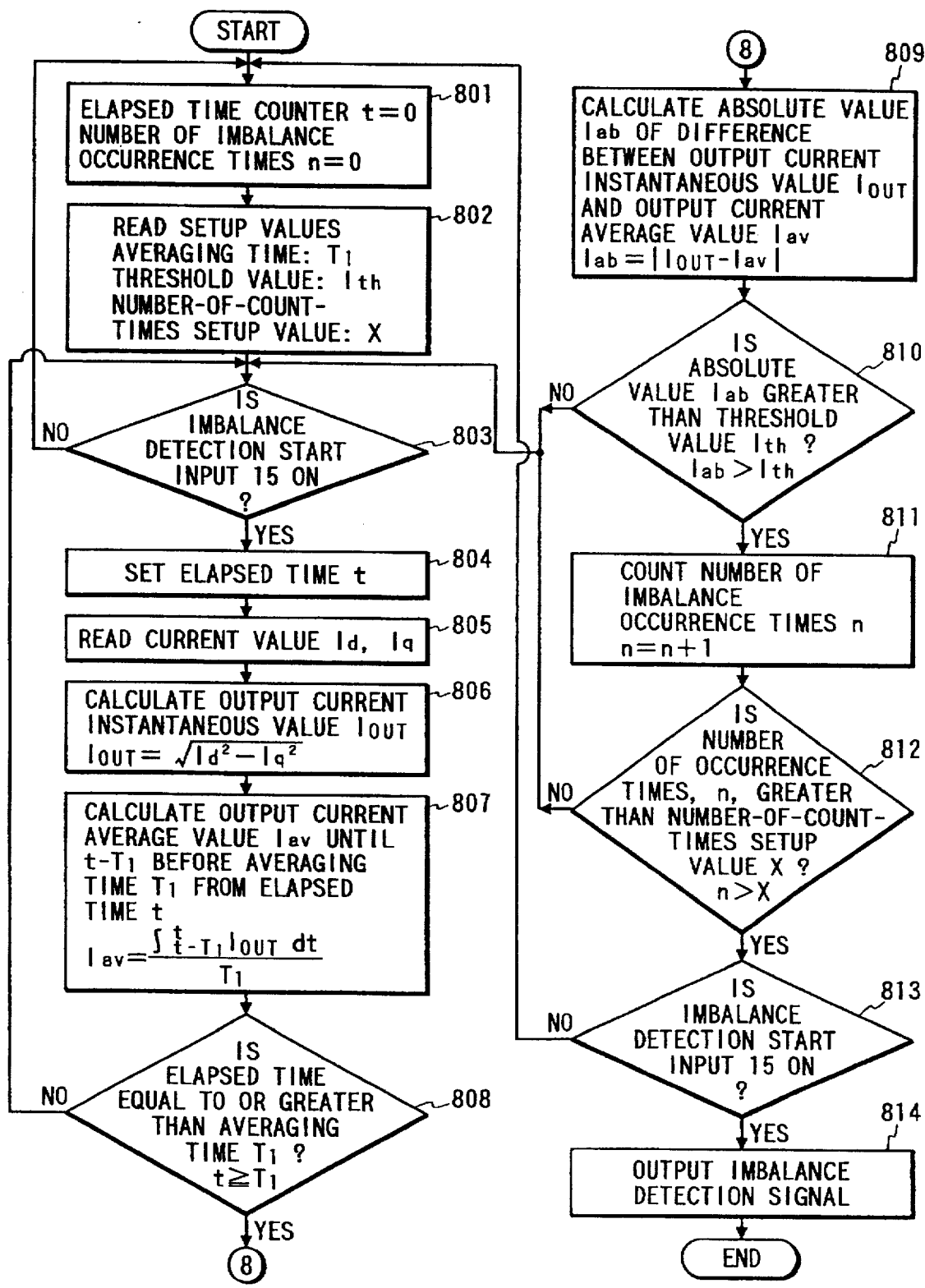
FIG. 12 is a flowchart showing the operation of the load condition detection device for the three-phase induction motor in FIG. 11.

FIG. 12 is a flowchart showing the operation of the load imbalance detector 13 in FIG. 11. In the figure, reference numeral 801 is a step at which an elapsed time counter t and the number of times, n, imbalance has occurred are cleared to 0, numeral 802 is a step at which averaging time T1, a threshold value $I_{th}$, and a setup value, X, of the number of count times are read from an input section 9, numeral 803 is a step at which whether or not imbalance detection start input by the detection execution signal input means 15 is on is determined, numeral 804 is a step at which the elapsed time from detection start is set, numeral 805 is a step at which the d-axis current and q-axis current from current converter 11 are read, numeral 806 is a step at which an output current instantaneous value is calculated, numeral 807 is a step at which an output current average value is calculated, numeral 808 is a step at which whether or not the time elapsed is equal to or greater than the averaging time T1 is determined, numeral 809 is a step at which the absolute value of the difference between the output current instantaneous value and the output current average value, $I_{ab}$, is calculated, numeral 810 is a step at which whether or not $I_{ab}$ is greater than the threshold value $I_{th}$ is determined, numeral 811 is a step at which 1 is added to the number of times, n, imbalance has occurred, numeral 812 is a step at which whether or not the number of times, n, imbalance has occurred is greater than the setup value, X, of the number of count times is determined, numeral 813 is a step at which whether or not imbalance detection start input by the detection execution signal input means 15 is on is determined, and numeral 814 is a step at which an imbalance detection signal is output.

The operation of this embodiment will now be discussed. In FIG. 11, when the detection execution signal input device 15 is on, an inverter 51 detects imbalance of the load of a three-phase induction motor 6 by the load imbalance detector 13 and outputs a signal by an output section 14. When the detection execution signal input device 15 is off, the inverter 51 terminates detection at the load imbalance detector 13. For example assume that when the load is a drum of a fully automatic washing machine, detection is required only in spin-drying and not required in washing or rinsing. If sequence control is performed in which the washing machine stops when an imbalance detection signal is output, it is disadvantageous to output an imbalance detection signal in error in washing or rinsing. Thus, the detection execution signal input device 15 is turned off so as not to detect imbalance. The operation of the imbalance detector 13 is discussed with reference to a flowchart of FIG. 12.

At step 801, the elapsed time counter t and the number of times, n, imbalance has occurred are cleared to 0 as an initial reset. At step 802, the averaging time T1 sufficiently longer than the period of output frequency at constant-speed time, threshold value $I_{th}$, and setup value, X, of the number of count times set through the input section 9 are read. At step 803, whether or not the detection execution signal input means 15 is on is determined. If it is off, no detection operation is performed and control returns to step 801. If the detection execution signal input means 15 is on, the elapsed time is set in the counter t at step 804. At step 805, the d-axis current $I_d$ and q-axis current $I_q$ are read from the current converter 11. At step 806, an output current instantaneous value $I_{OUT}$ is calculated. Next, at step 807, an average value of output current until t−T1 before the averaging time T1 from the elapsed time t is calculated. The output current average value $I_{av}$ is updated each time the elapsed time t has elapsed. At step 808, whether or not the elapsed time is equal to or greater than the averaging time T1 is determined for judging that calculation of the first output current average value $I_{av}$ is complete. If the elapsed time t is less than the averaging time T1, calculation of the first output current average value $I_{av}$ is not complete. Then, control returns to step 803.

If t>T1, calculation of the first output current average value $I_{av}$ is complete. Then, control goes to step 809 at which the absolute value $I_{ab}$ of the difference between the output current instantaneous value $I_{OUT}$ and the output current average value $I_{av}$ is calculated. At step 810, the threshold value $I_{th}$ read at step 802 is compared with the absolute value of the difference, $I_{ab}$. When $I_{ab}>I_{th}$ at step 810, 1 is added to the number of times, n, imbalance has occurred at step 811. If $I_{ab} \leq I_{th}$, the load is judged to be balanced, and control returns to step 803. At step 812, whether or not the number of times, n, imbalance has occurred is greater than the setup value, X, of the number of count times read at step 802 is determined. If n>X, the load is judged to be unbalanced and control goes to step 813 at which again whether or not the detection execution signal input means 15 is on is determined. If it is off, no detection operation is performed and control returns to step 801 at which the elapsed time counter t and the number of times, n, imbalance has occurred are cleared to 0. If the detection execution signal input means 15 is on, an imbalance detection signal is output at step 814. If n≦X at step 812, control returns to step 803.

Thus, imbalance of the load of the three-phase induction motor can be detected only when necessary. For example, with a washing machine, imbalance detection is executed only during spin-drying and not executed in washing or rinsing.

Figure 13:
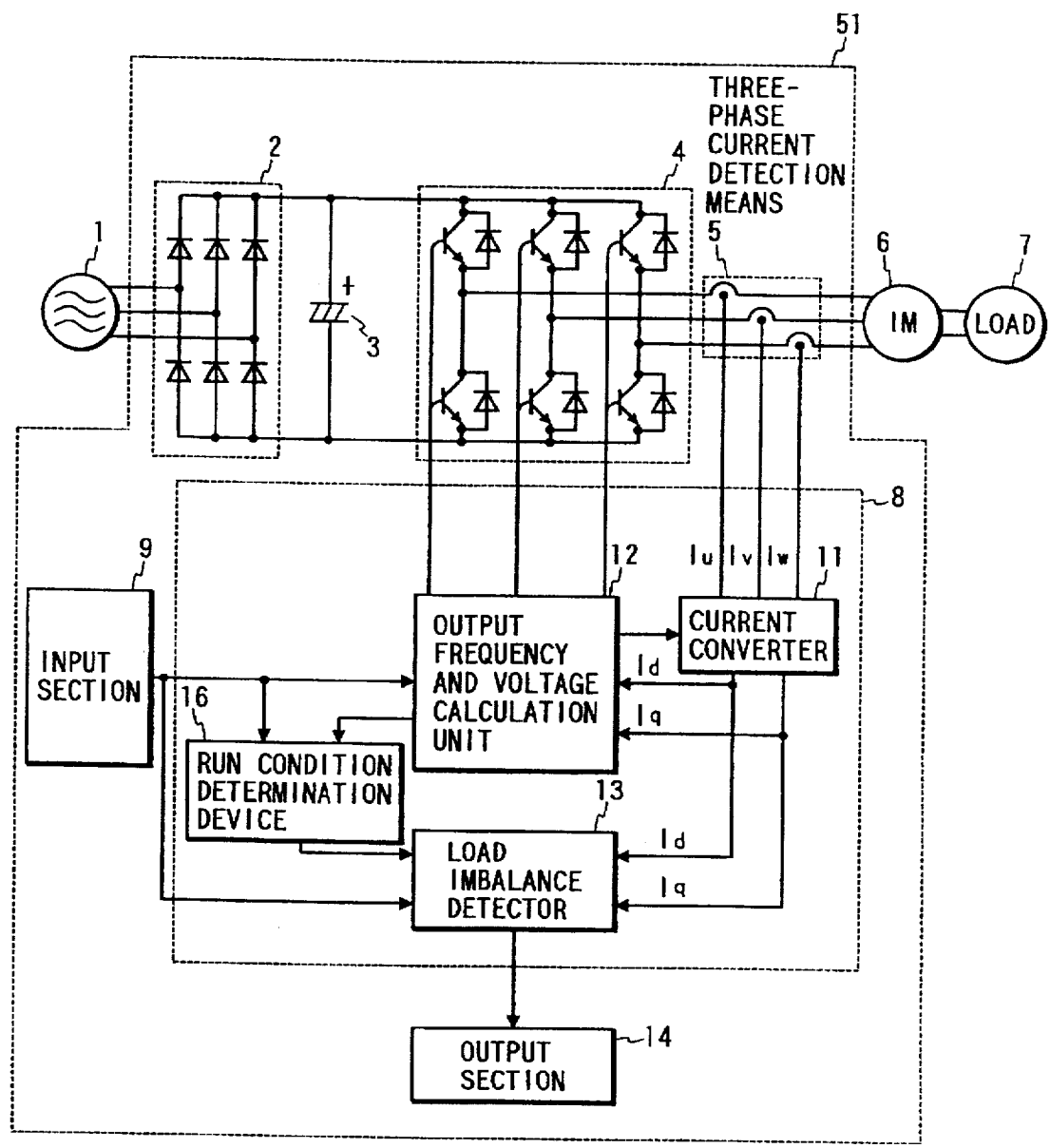
FIG. 13 is a block diagram showing a load condition detection device for a three-phase induction motor according to a seventh embodiment of the invention.

FIG. 13 is a block diagram showing a load condition detection device for a three-phase induction motor according to a seventh embodiment of the invention. Parts the same as those previously described with reference to FIG. 1 are denoted by the same reference numerals in FIG. 13 and will not be discussed again. Reference numeral 16 is run condition determination device for determining a run condition of an inverter from an output frequency from output frequency and voltage calculation unit 12 and a specified frequency through an input section 9 and if the inverter runs at constant speed, for sending a signal to load imbalance detector 13 at the constant-speed time.

Figure 14:
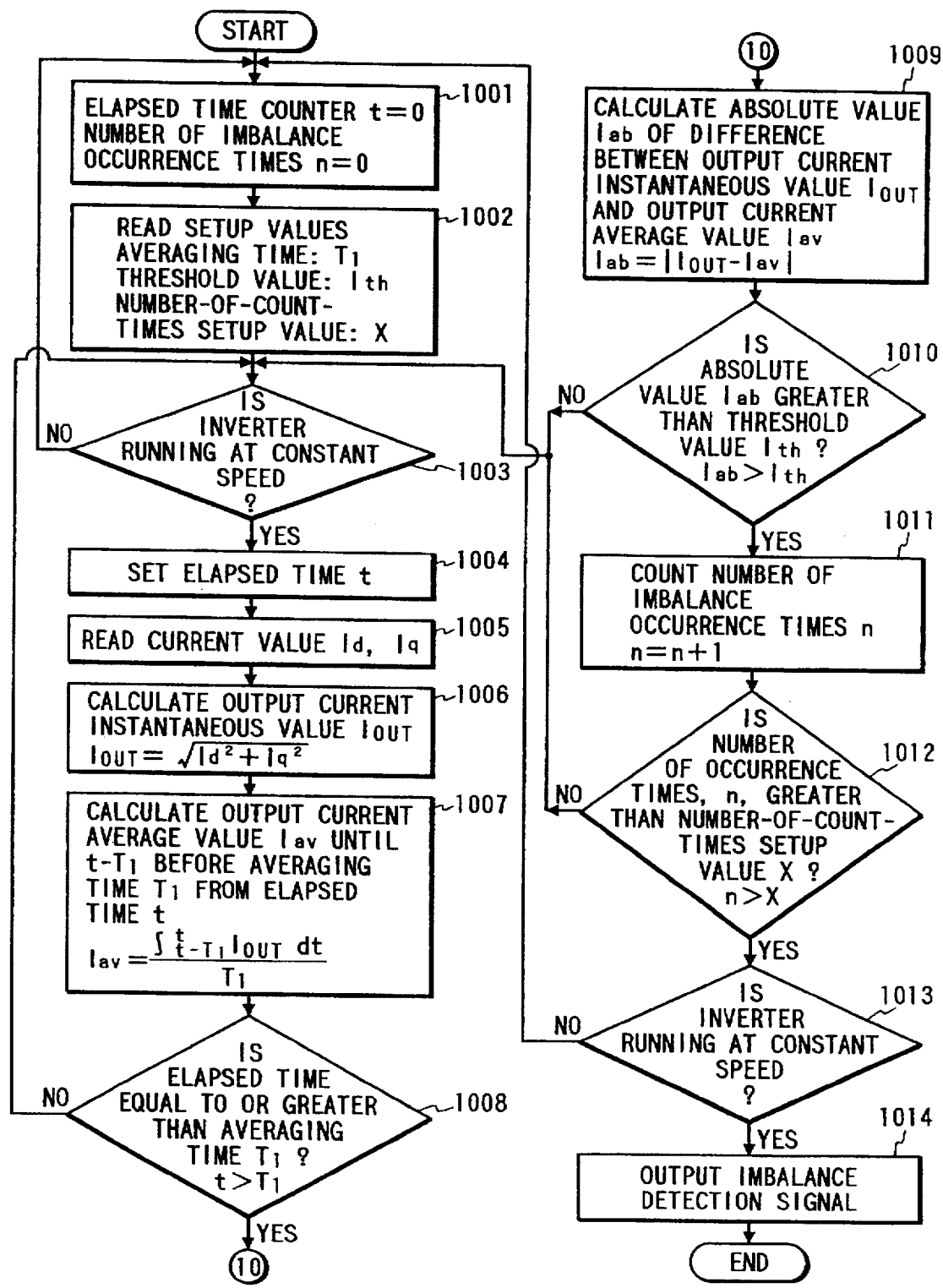
FIG. 14 is a flowchart showing the operation of the load condition detection device for the three-phase induction motor in FIG. 13.

FIG. 14 is a flowchart showing the operation of the load imbalance detector 13 in FIG. 13. In the figure, numeral 1001 is a step at which an elapsed time counter t and the number of times, n, imbalance has occurred are cleared to 0, numeral 1002 is a step at which averaging time T1, a threshold value $I_{th}$, and a setup value, X, of the number of count times are read from the input section 9, numeral 1003 is a step at which whether or not the inverter is running at constant speed is determined, numeral 1004 is a step at which the elapsed time from detection start is set, numeral 1005 is a step at which the d-axis current and q-axis current from current converter 11 are read, numeral 1006 is a step at which an output current instantaneous value is calculated, numeral 1007 is a step at which an output current average value is calculated, numeral 1008 is a step at which whether or not the time elapsed is equal to or greater than the averaging time T1 is determined, numeral 1009 is a step at which the absolute value of the difference between the output current instantaneous value and the output current average value, $I_{ab}$, is calculated, numeral 1010 is a step at which whether or not $I_{ab}$ is greater than the threshold value $I_{th}$ is determined, numeral 1011 is a step at which 1 is added to the number of times, n, imbalance has occurred numeral, 1012 is a step at which whether or not the number of times, n, imbalance has occurred is greater than the setup value, X, of the number of count times is determined, numeral 1013 is a step at which whether or not the inverter is running at constant speed, and numeral 1014 is a step at which an imbalance detection signal is output.

Figure 15:
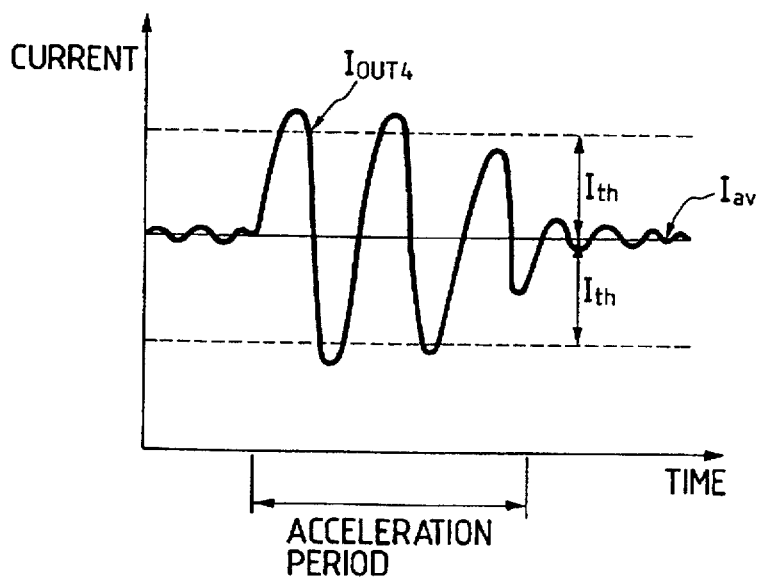
FIG. 15 is a current waveform diagram showing an operation of the load condition detection device for FIG. 13.

FIG. 15 is a current waveform diagram for explaining operation of the load unbalance detecting device 13 of FIG. 13.

The operation of this embodiment will now be discussed. In FIG. 13, when the output frequency from the output frequency and voltage calculation unit 12 matches the specified frequency through the input section 9 at the run condition determination device 16, the device 16 determines that the inverter runs at constant speed, and sends a signal indicating that the inverter is running at constant speed to the load imbalance detector 13, which then starts detecting imbalance of a load of a three-phase induction motor 6. Upon detection of load imbalance, the load imbalance detector 13 outputs a load imbalance detection signal from the output section 14. When the output frequency from the output frequency and voltage calculation unit 12 does not match the specified frequency through the input section 9 at the run condition determination device 16, the device 16 determines that the inverter is in acceleration or deceleration, and the load imbalance detector 13 does not operate.

The operation of the imbalance detector 13 is discussed with reference to a flowchart of FIG. 14. At step 1001, the elapsed time counter t and the number of times, n, imbalance has occurred are cleared to 0 as an initial reset. At step 1002, the averaging time T1 sufficiently longer than the period of output frequency at constant-speed time, threshold value $I_{th}$, and setup value, X, of the number of count times set through the input section 9 are read. At step 1003, whether or not the inverter is running at constant speed is determined depending on the presence or absence of a signal from the run condition determination device 16. No detection operation is performed in the absence of the signal. Then, control returns to step 1001. If the signal from the run condition determination device 16 exists, the elapsed time is set in the counter t at step 1004. At step 1005, the d-axis current $I_d$ and q-axis current $I_q$ are read from the current converter 11. At step 1006, an output current instantaneous value $I_{OUT}$ is calculated. Next, at step 1007, an average value of output current until t−T1 before the averaging time T1 from the elapsed time t is calculated. The output current average value $I_{av}$ is updated each time the elapsed time t has elapsed. At step 1008, whether or not the elapsed time is equal to or greater than the averaging time T1 is determined for judging that calculation of the first output current average value $I_{av}$ is complete. If the elapsed time t is less than the averaging time T1, calculation of the first output current average value $I_{av}$ is not complete. Then, control returns to step 1003. If t>T1 calculation of the first output current average value $I_{av}$ is complete. Then, control goes to step 1009 at which the absolute value $I_{ab}$ of the difference between the output current instantaneous value $I_{OUT}$ and the output current average value $I_{av}$ is calculated. At step 1010, the threshold value $I_{th}$ read at step 1002 is compared with the absolute value of the difference, $I_{ab}$.

When $I_{ab}>I_{th}$ at step 1010, 1 is added to the number of times, n, imbalance has occurred at step 1011. If $I_{ab}\leq I_{th}$, the load is judged to be balanced, and control returns to step 1003. At step 1012, whether or not the number of times, n, imbalance has occurred is greater than the setup value, X, of the number of count times read at step 1002 is determined. If n>X, the load is judged to be unbalanced and control goes to step 1013 at which again whether or not the inverter is running at constant speed is determined depending on the presence or absence of a signal from the run condition determination device 16. No detection operation is performed in th absence of the signal. Then, control returns to step 1001 at which the elapsed time counter t and the number of times, n, imbalance has occurred are cleared to 0. If the signal from the run condition determination device 16 exists, an imbalance detection signal is output at step 1014. If n≦X at step 1012, control returns to step 1003.

Thus, even if load imbalance occurs in acceleration or deceleration in FIG. 15, no detection operation is performed, so that load running will not stop unnecessarily. For example, torque imbalance in running at constant steed is only detected and transient torque imbalance in acceleration or deceleration is not detected.

Figure 16:
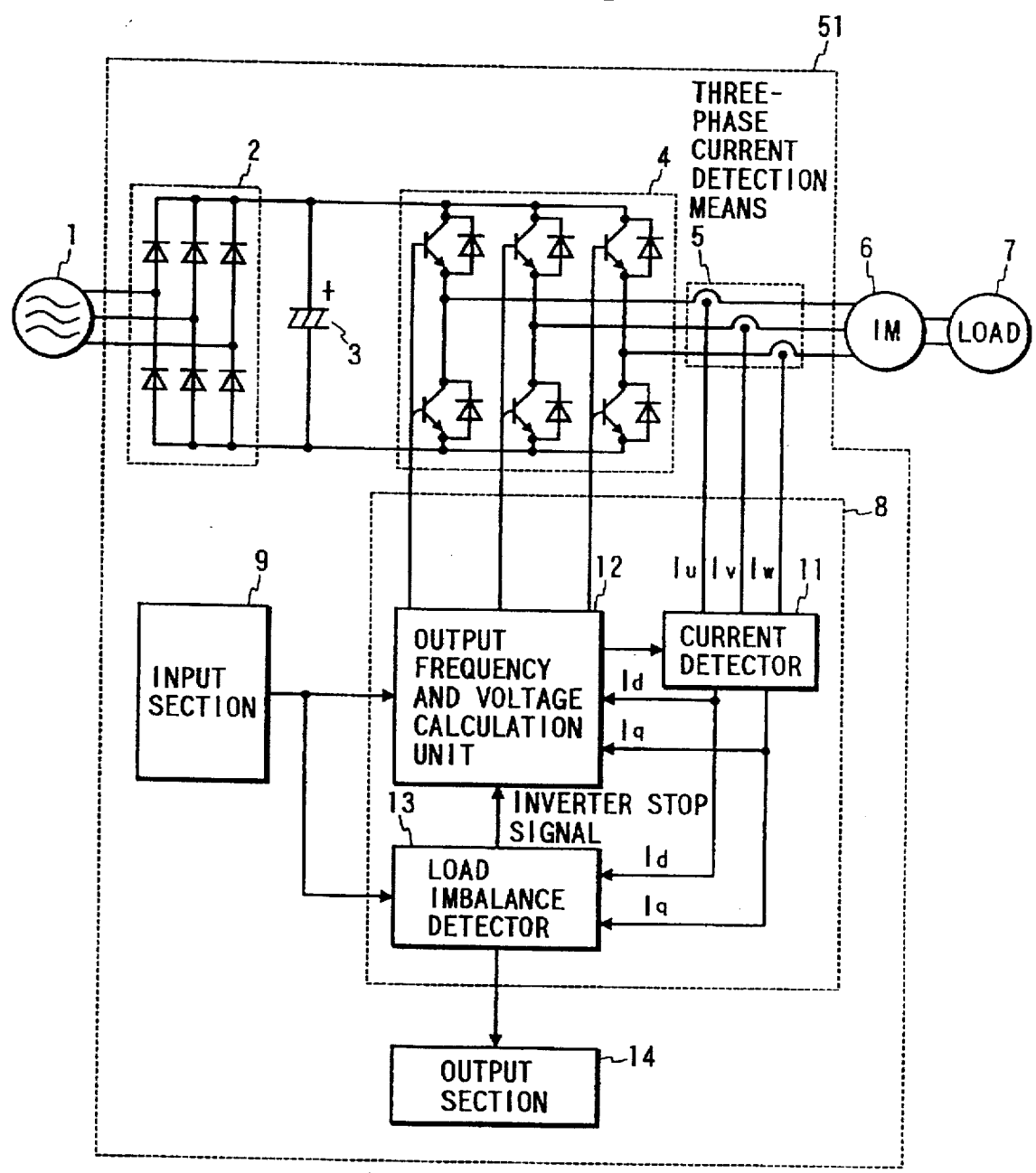
FIG. 16 is a block diagram showing a load condition detection device for a three-phase induction motor according to an eighth embodiment of the invention.

FIG. 16 is a block diagram showing a load condition detection device for a three-phase induction motor according to an eighth embodiment of the invention. Parts the same as those previously described with reference to FIG. 1 are denoted by the same reference numerals in FIG. 16 and will not be discussed again. When load imbalance is detected, an inverter stop signal is sent from the load imbalance detector 13 to the output frequency and voltage calculation unit 12, and the inverter 51 decelerates and stops a three-phase induction motor 8. This eliminates the need for programming an external sequence in sequence control for stopping a washing machine when an imbalance detection signal is output.

When load imbalance occurs, automatically the motor is decelerated and stopped in response to the stop signal from the load imbalance detector. Thus, load imbalance is prevented from causing damage to the machine. For example, the motor shaft of the three-phase induction motor will not be damaged or eccentricity will not cause the load to strike against a wall, damaging the machine; an external sequence for preventing damage is not required either.

Figure 17:
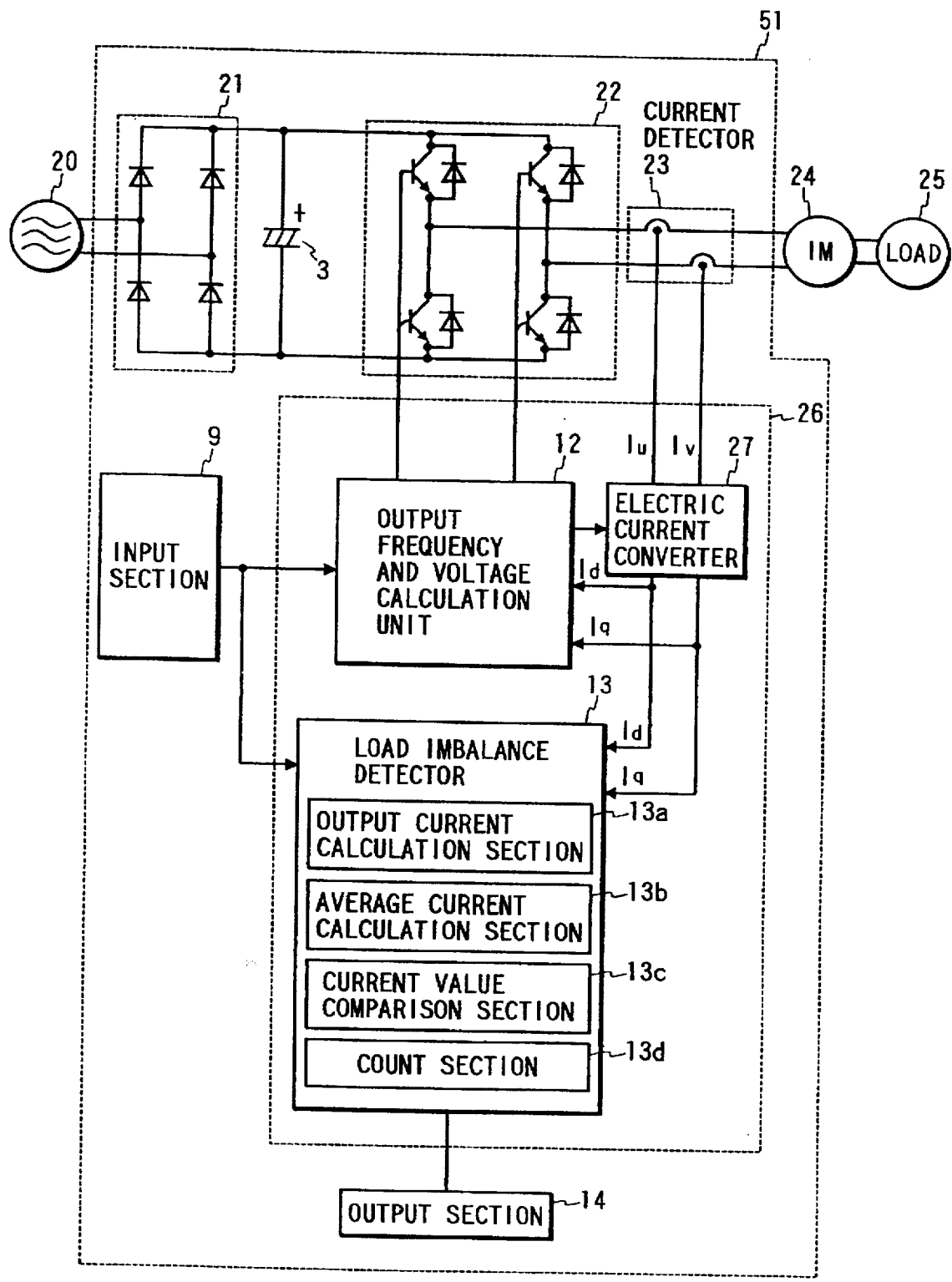
FIG. 17 is a block diagram showing a load condition detection device for a single-phase induction motor according to a ninth embodiment of the invention.

FIG. 17 is a block diagram showing an embodiment of applying the load condition detection device to a single-phase induction motor, wherein reference numeral 20 is a single-phase AC power supply, numeral 21 is a converter section of inverter, numeral 3 is a smoothing capacitor of the inverter, numeral 22 is an inverter section of the inverter, numeral 23 is current detector of the inverter, numeral 24 a single-phase induction motor, numeral 25 is a load of the single-phase induction motor, numeral 26 is a control section of the inverter, numeral 9 is an input section of the inverter for inputting a run command setup value, numeral 27 is electric current converter for converting a two-phase current detected by the two-phase current detector 23 into a current in the d-q axis rotating in synchronization with an output frequency and determining a d-axis current, an excitation phase current in vector control and a q-axis current, a torque phase current, numeral 12 is an output frequency and voltage calculation unit for calculating an output frequency and an output voltage from the setup value from the input section 9 and the d-axis current and q-axis current from the current converter 27, numeral 13 is load imbalance detector for detecting current fluctuation occurring secondarily as a result of load imbalance from the d-axis current and q-axis current from the current converter 27, numeral 14 is an output section for outputting a signal to the outside upon detection of load imbalance, and numeral 5 is the entire inverter.

The imbalance detection signal in the first to ninth embodiments may be output as an electric signal such as open collector, relay output, audio output such as a buzzer, or optical output such as LED, for example.

Since the three-phase current sum is 0 in the first to eighth embodiments, if two phases are determined, the remaining phase can be calculated. Therefore, only two of the three phases need be detected for current detection.

Further, a value input to the setting device in the first to eighth embodiments can be changed as desired from the external for changing the level of load imbalance to be detected.

In the first to eighth embodiments, use of an inverter has been discussed, but the invention is applicable to other variable-frequency, variable-voltage output devices, needless to say.

Although use of the d and q axes has been discussed in the description of load detection of the three-phase induction motor in the first to eighth embodiments, a motor load can be detected using only the q axis as discussed in connection with the second embodiment. Therefore, other load condition detection devices can be employed by replacing the control sections of the inverters in the third to eighth embodiments with the control section of the inverter described in the second embodiment.

A description has been given taking the load imbalance detection device for a three-phase induction motor driven by the inverter as an example, but the variable-frequency, variable-voltage application power supply is not limited to the inverter. The description concerning the three-phase induction motor is also applied to other induction motors.

Thus, according to the invention, the load condition detection device for an induction motor effecting rotation of a load when a predetermined current is input comprises a current detector for detecting a current instantaneous value of the current, average current detection means for determining a current average value based on the current instantaneous value and a predetermined average time, current value comparison means for determining a difference between the current instantaneous value and the current average value, counting means for comparing the value obtained by the current value comparison means with a first predetermined value and counting the number of times the obtained value has exceeded the predetermined value, and means for stopping the rotation of the load if the value counted by the counting means within a predetermined time exceeds a second predetermined value, whereby load imbalance is prevented from causing mechanical damage to the device and is detected electrically. Therefore, there is provided a load condition detection device for an induction motor which enables easy change of load imbalance detection level and has detection precision not changing with time at low costs.

The load condition detection device for an induction motor effecting rotation of a load when a predetermined current is input comprises a current detection means for detecting a current instantaneous value, average current detection means for determining a current average value based on the current instantaneous value and a predetermined average time, current value comparison means for determining a difference between the current instantaneous value and the current average value, counting means for comparing the value obtained by the current value comparison means with a first predetermined value and counting the number of times the obtained value has exceeded the predetermined value, and alarm means for informing the user that the load is in an imbalanced condition, whereby load imbalance is prevented from causing mechanical damage to the device and is detected electrically. Therefore, there is provided a load condition detection device for an induction motor which enables easy change of load imbalance detection level and has detection precision not changing with time at low costs.

The instantaneous value of a current for the load is detected, a current average value of the current instantaneous values for a predetermined average time thereof is determined, an absolute value of a difference between the current instantaneous value and the current average value is determined, the number of times the absolute value exceeds a predetermined value is detected, and a load condition detection signal is output in response to the detection value, thereby detecting load imbalance electrically. Therefore, there is provided an induction motor load condition detection method which enables easy change of load imbalance detection level and has detection precision not changing with time at low cost.

A current instantaneous value of q-axis current into which a current for a load is converted by d-q axis current conversion means is detected, a q-axis current average value of the current instantaneous values for a predetermined average time thereof is determined, an absolute value of a difference between the q-axis current instantaneous value and the q-axis current average value is determined, the number of times the absolute value exceeds a predetermined value is detected, and a load condition detection signal is output in response to the detection value, thereby stably and easily detecting load imbalance with high accuracy only with the q-axis current instantaneous value without using the d-axis current instantaneous value.

A current instantaneous value of an input current for a load is detected, a first current average value for a first predetermined average time sufficiently short as compared with a load period of the current instantaneous values and a second current average value for a second predetermined average time sufficiently long as compared with the load period are determined, an absolute value of a difference between the first and second output current average values is determined, the number of times the absolute value exceeds a predetermined value is detected, and a load condition detection signal is output in response to the detection value, thereby preventing the effect of noise, etc., from causing erroneous detection and eliminating the need for setting a large threshold value of difference current value for detecting load imbalance more than necessary. Therefore, load imbalance can be detected with higher accuracy.

A current instantaneous value of a current for a load is detected, a current average value of the current instantaneous values for a predetermined average time thereof is determined, an absolute value of a difference between the current instantaneous value and the current average value is determined, the number of times a case occurs where the absolute value exceeds a predetermined value and differs in polarity from the preceding difference current exceeding the predetermined value is determined, and a load condition detection signal is output in response to the detection value, thereby eliminating the need for setting a large threshold value of difference current value for detecting load imbalance more than necessary. Therefore, load imbalance can be detected with higher accuracy.

The number of times the absolute value exceeds the predetermined value is detected every predetermined time, and only when the predetermined number of times is exceeded within predetermined time, the load condition detection signal is output. If the number of times imbalance has occurred is small, it is handled as erroneous detection, whereby load imbalance is not detected more than necessary. Therefore, induction motor load running can be performed efficiently.

The load condition detection signal can be output, only when necessary, by load condition detection start and end signals.

A specified frequency is compared with an output frequency for determining whether or not running at constant speed is being performed, and if it is determined that running at constant speed is being performed, the load condition detection operation is started by a signal indicating running at constant speed. Therefore, even if load imbalance occurs during accelerating or decelerating, the load condition detection operation is not performed, so that load running is not stopped unnecessarily.

What is claimed is:

1. A load condition detection device for an induction motor, which detects a motion for a load when a predetermined current is input, comprising:

current detection means for detecting a current instantaneous value of the current supplied to the motor;

average current detection means for determining a current average value based on the current instantaneous value and a predetermined average time;

current value comparison means for determining a difference between the current instantaneous value and the current average value;

counting means for comparing the value obtained by the current value comparison means with a first predetermined value and counting the number of times the obtained value has exceeded the predetermined value; and means for producing an output signal indicating an unbalanced condition of the load according to the number of times the obtained value has exceeded the first predetermined value.

2. The load condition detection device of claim 1, wherein rotation of the load is stopped in response to the output signal if the value counted by the counting means within a predetermined time exceeds a second predetermined value.

3. The load condition detection device for claim 1, further comprising means for generating an alarm in response to the output signal to inform the user that the load is in an imbalanced condition.

4. An induction motor load condition detection method comprising the steps of:

detecting a current instantaneous value of a current supplied to a motor;

determining a current average value of the current instantaneous values for a predetermined average time thereof;

determining an absolute value of a difference between the current instantaneous value and the current average value;

detecting the number of times the absolute value exceeds a predetermined value; and outputting a signal which indicates a balance condition of the load in response to the detection value.

5. An induction motor load condition detection method comprising the steps of:

detecting a current instantaneous value of q-axis current into which a current for a motor is converted by d-q axis current conversion means;

determining a q-axis current average value of the current instantaneous values for a predetermined average time thereof;

determining an absolute value of a difference between the q-axis current instantaneous value and the q-axis current average value;

detecting the number of times the absolute value exceeds a predetermined value; and outputting a signal which indicates a balance condition of the load in response to the detection value.

6. An induction motor load condition detection method comprising the steps of:

detecting a current instantaneous value of a current for a motor;

determining a first current average value for a first predetermined average time which is short as compared with a load period of the current instantaneous values and a second current average value for a second predetermined average time which is long as compared with the load period;

determining an absolute value of a difference between the first and second current average values;

detecting the number of times the absolute value exceeds a predetermined value; and outputting a signal which indicates a balance condition of the load in response to the detection value.

7. An induction motor load condition detection method comprising the steps of:

detecting a current instantaneous value of a current for a load;

determining a current average value of the current instantaneous values for a predetermined average time thereof;

determining an absolute value of a difference between the current instantaneous value and the current average value;

detecting number of times a case occurs where the absolute value exceeds a predetermined value and differs in polarity from a next-preceding difference current and determining whether the number exceeds a predetermined amount; and outputting a signal which indicates a balance condition of the load in response to the detection value.

8. The method of claim 4, wherein the number of times in which the absolute value exceeds the predetermined value is detected every predetermined time and only when the predetermined number of times is exceeded within predetermined time, the signal which indicates a balance condition of the load is output.

9. The method of claim 4, wherein the signal which indicates a balance condition of the load is output in response to load condition detection start and end signals.

10. The method of claim 5, wherein the signal which indicates a balance condition of the load is output in response to load condition detection start and end signals.

11. The method of claim 6, wherein the signal which indicates a balance condition of the load is output in response to load condition detection start and end signals.

12. The method of claim 7, wherein the signal which indicates a balance condition of the load is output in response to load condition detection start and end signals.

13. The method of claim 4, wherein a specified frequency is compared with an output frequency for determining whether or not running at constant speed is being performed, and if it is determined that running at constant speed is being performed, the load condition detection operation is started by a signal indicating running at constant speed.

14. The method of claim 5, wherein a specified frequency is compared with an output frequency for determining whether or not running at constant speed is being performed, and if it is determined that running at constant speed is being performed, the load condition detection operation is started by a signal indicating running at constant speed.

15. The method of claim 6, wherein a specified frequency is compared with an output frequency for determining whether or not running at constant speed is being performed, and if it is determined that running at constant speed is being performed, the load condition detection operation is started by a signal indicating running at constant speed.

16. The method of claim 7, wherein a specified frequency is compared with an output frequency for determining whether or not running at constant speed is being performed, and if it is determined that running at constant speed is being performed, the load condition detection operation is started by a signal indicating running at constant speed.

* * * * *